(12) United States Patent
Fujii et al.

(10) Patent No.: US 7,199,976 B2
(45) Date of Patent: Apr. 3, 2007

(54) REEL LOCK MECHANISM OF TAPE CASSETTE AND TAPE CASSETTE

(75) Inventors: Hiroshi Fujii, Tokyo (JP); Sunao Kushiro, Chiba (JP); Shuichi Ota, Saitama (JP); Takashi Ota, Miyagi (JP)

(73) Assignee: Sony Corporation (JP)

( * ) Notice: Subject to any disclaimer, the term of this patent is extended or adjusted under 35 U.S.C. 154(b) by 115 days.

(21) Appl. No.: 11/061,638

(22) Filed: Feb. 22, 2005

(65) Prior Publication Data
US 2005/0139707 A1 Jun. 30, 2005

Related U.S. Application Data

(63) Continuation of application No. 10/333,401, filed as application No. PCT/JP02/05230 on May 29, 2002, now Pat. No. 6,937,437.

(30) Foreign Application Priority Data

May 30, 2001 (JP) ............................ P2001-161715
Jun. 12, 2001 (JP) ............................ P2001-176548

(51) Int. Cl.
*G11B 15/32* (2006.01)

(52) U.S. Cl. ..................................... 360/132

(58) Field of Classification Search ..................... None
See application file for complete search history.

(56) References Cited

U.S. PATENT DOCUMENTS 4,288,048 A * 9/1981 Sieben .................... 242/338.3

FOREIGN PATENT DOCUMENTS

| JP | 04-26587 A | 9/1992 |
| JP | 09-161439 A | 6/1997 |
| JP | 2001-23339 A | 1/2001 |

OTHER PUBLICATIONS

International Search Report dated Jul. 9, 2002.

* cited by examiner

*Primary Examiner*—Hoa T. Nguyen
*Assistant Examiner*—Mark Blouin
(74) *Attorney, Agent, or Firm*—Rader Fishman & Grauer; Ronald P. Kananen

(57) ABSTRACT

Each lock portion (15) has a front portion (23) including an anchoring pawl (24) and a back portion (25) extending in a direction opposite to the front portion. Therefore, when a slider (14) withdraws, each back portion comes into contact with the inside surface of a back wall (10) of a cassette shell (4) and each lock portion rotates in an unlocking direction. A bottom surface (109) defining each recess between engaging teeth (107) has a central portion which protrudes in a chevron shape. A corner of each protrusion has tapered surfaces (110') and (110"). An anchoring pawl of each lock portion has a flat surface that comes into contact with one inclined surface (109') of a chevron-shaped portion of any one of the recesses and one tapered surface (110') of a protrusion disposed behind the adjacent recess.

6 Claims, 33 Drawing Sheets

(A)

(B)

(A)

(B)

REEL LOCK MECHANISM OF TAPE CASSETTE AND TAPE CASSETTE

CROSS REFERENCE TO RELATED APPLICATIONS

The present application is a Continuation Application of patent application Ser. No. 10/333,401, filed on Jul. 14, 2003 now U.S. Pat. No. 6,937,437, which is a 371 of PCT/JP02/05230 filed May 29, 2002, the entire contents of which are incorporated herein by reference.

TECHNICAL FIELD

The present invention relates to a reel lock mechanism of a tape cassette and a tape cassette using the reel lock mechanism. More specifically, the present invention relates to a technology for achieving size reduction of a tape cassette, for stabilizing operation of a reel lock, and for preventing reverse rotation of a tape reel when the tape reel is unlocked.

BACKGROUND ART

Ordinarily, a tape cassette rotatably accommodates two tape reels inside a cassette shell, with the two tape reels having a tape-shaped recording medium, such as a magnetic tape, wound thereupon.

There is a tape cassette comprising a reel lock mechanism for preventing rotation of the tape reels when the tape cassette is not loaded to a tape drive device. By this structure, when the tape cassette is not loaded, even if, for example, vibration is exerted upon the tape cassette, a magnetic tape is prevented from becoming slack caused by rotation of the tape reels.

FIGS. 1 and 2 and FIGS. 23 to 28 illustrate a tape cassette b including a related reel lock mechanism a FIGS. 1 and 2 show the entire tape cassette b, and are also used to illustrate a first embodiment of the present invention described later. Of the symbols used, reference numerals are used to denote component parts used in the present invention, while lowercase alphabetical letters are used to denote component parts used in the related technology.

In the tape cassette b, two tape reels e and e upon which a magnetic tape d is wound are rotatably accommodated inside a cassette shell c. A plurality of engaging teeth f, f, . . . , serving as protrusions, are formed at the outer peripheral edge of a lower flange of each of the tape reels e and e, with recesses being formed therebetween (see FIGS. 25 to 28).

The reel lock mechanism a is provided in a substantially triangular space (hereinafter referred to as "the triangular space"), defined by the back wall and the two reels e and e, inside the cassette shell c. A rectangular hole g is formed in a portion of the bottom surface of the cassette shell c where the reel lock mechanism a is situated. When the tape cassette b is loaded into a tape drive device, an insertion pin h, provided at the tape drive device, is inserted into the cassette shell c from the rectangular hole g, and acts on the reel lock mechanism a in order to unlock the tape reels e and e (see FIGS. 25 to 28).

The reel lock mechanism a comprises a slider i, two lock portions j and j, a lock spring k, and a slide spring 1 (see FIGS. 23 and 24).

The slider i is supported so as to be movable forward and backward inside the triangular space. Upwardly protruding support shafts m and m, which are separated in the leftward and rightward directions, are provided at the back end of the slider i. A placement recess n, which opens upward and backward, is formed between the support shafts m and m of the slider i (see FIGS. 23 and 24).

A pin insertion recess o for inserting the insertion pin h of the tape drive device is formed in the bottom surface of a block situated forwardly of the placement recess n in the slider i, with the lower half of the back surface defining the pin insertion recess o being an inclined surface p which is displaced backward as it extends downward.

Lock portions j each comprise one plate member having a chevron shape as a whole in plan view. Cylindrical support portions q extending vertically are integrally formed with the back edges of their respective plate members. The front ends of the two lock portions j and j extend away from each other. Tapered anchoring pawls r and r are formed at the front ends of the respective lock portions j and j (see FIGS. 23 and 24).

Spring catch portions s are formed on the top side edges of the respective lock portions j between the support portions q and the respective anchoring pawls r. Lower side edges of the respective lock portions j have forms in which the front side portions thereof protrude downward from substantially the longitudinal centers of the respective lock portions j. The back edges of the respective downwardly protruding portions are cam followers t which come into contact with respective cams (described later) for rotating the respective lock portions j (see FIGS. 23 and 24).

Externally fitting the support portions q to their respective support shafts m of the slider i rotatably supports the lock portions j at the slider I (see FIGS. 23 and 24).

Anti-rotation portions are provided at the respective lock portions j, so that the angle of rotation in the direction in which they engage the engaging teeth f of the tape reels e does not become equal to or greater than a predetermined angle.

The lock spring k is a torsion coil spring, in which coil portions u and u, a linking portion v linking the coil portions u and u, and engaging portions w and w are integrally formed, with the coil portions u and u being separated in the leftward and rightward directions and the engaging portions w and w protruding from their respective coil portions u and u and being positioned outwardly of the linking portion v. The two coil portions u and u are supported at their respective support shafts m and m by being externally fitted to the top sides of the support portions q and q of their respective lock portions j and j. The two engaging portions w and w engage the spring catch portions s and s of the two lock portions j and j, so that the lock portions j and j are biased in the directions in which the anchoring pawls r and r move away from each other, that is, in the directions in which the anchoring pawls r and r engage the engaging teeth f and f of the respective tape reels e and e (see FIG. 24).

The slide spring l is a helical compression spring, and is provided in a compressed manner between the inside surface of the back wall of the cassette shell c and the placement recess n of the slider i. By this, the slider i is biased forward (see FIGS. 25 to 28).

Ribs x and x having small heights measured from the bottom surface are provided in a standing manner on both the left and right sides of the slider i inside the cassette shell c. In plan view, the ribs x and x comprise portions extending in the direction in which the slider i slides, portions which are one size larger than the outer peripheral edges of the respective tape reels e and e, and portions which are located in the paths of movement of the respective lock portions j and j. Of these portions, the portions located in the paths of movement of the respective lock portions j and j, more specifically, the portions situated in correspondence with the respective cam followers t and t are cams y and y for controlling rotation of the respective lock portions j and j (see FIGS. 23 and 24).

When the tape cassette b is not loaded to a tape drive device, the slider i is biased forward, and the cam followers t and t of the respective lock portions j and j are separated from the respective cams y and y, so that the anchoring pawls r and r at the front ends of the respective lock portions j and j are rotated in the directions in which they move away from each other, and engage an engaging tooth f and an engaging tooth f of the respective tape reels e and e, thereby locking the tape reels e and e (see FIG. 25). In other words, the tape reels e and e are prevented from rotating in the direction in which the magnetic tape d becomes slack.

Since the slider i is biased forward, a rotational force is applied to the two tape reels e and e through the respective anchoring pawls r and r in the direction in which the magnetic tape d is tensioned, so that the magnetic tape d is maintained in a tensioned state when the tape reels e and e are locked.

When the tape cassette b is loaded into a tape drive device, the insertion pin h of the tape drive device is inserted into the cassette shell c from the rectangular hole g of the cassette shell c, and comes into contact with the inclined surface p defining the pin insertion recess o of the slider i (see FIG. 26(B)).

When the insertion pin h is further inserted into the pin insertion recess o of the slider i, the front end of the insertion pin h pushes the inclined surface p, so that the slider i moves towards the back against the biasing force of the slide spring 1 (see FIG. 27).

The cam followers t and t of the respective lock portions j and j come into contact with the respective cams y and y, and move towards the back along the cams y and y, so that the lock portions j and j rotate in the direction in which the anchoring pawls r and r move towards each other. By this, the anchoring pawls r and r of the respective lock portions j and j move away from the respective tape reels e and e, so that the tape reels e and e are unlocked, and are brought into a rotatable state (see FIG. 28).

Next, FIGS. 1 and 2, FIGS. 14 to 17, and FIGS. 31 to 35 illustrate a tape cassette b including another related reel lock mechanism a'. This related reel lock mechanism a' differs from the above-described related reel lock mechanism a only in the forms of the cam followers. These cam followers will be primarily described. Accordingly, the other parts corresponding to those of the reel lock mechanism a will be given the same reference numerals, and will not be described below. The overall form of this tape cassette b is substantially the same as the above-described tape cassette b. Accordingly, the reel lock mechanism illustrated in FIGS. 1 and 2 is labeled a', and a general description thereof will not be given below.

FIGS. 14 to 17 are also used to illustrate a second embodiment of the present invention described later. Of the symbols used, reference numerals are used to denote the component parts used in the present invention, while lower-case alphabetical letters are used to denote the component parts used in the related technology. Of the forms of the component parts shown in FIGS. 14 and 15, the forms of anchoring pawls, which are front end portions of respective lock portions, are those used in the second embodiment of the present invention. The second embodiment differs from the related technology only in the forms of the anchoring pawls. The forms of the anchoring pawls, which are front end portions of respective lock portions used in the related technology, are shown in FIGS. 31 to 35.

Spring catch portions s are integrally formed with the top edges of respective lock portions j between support portions q and respective anchoring pawls r (see FIGS. 14 and 15). Downwardly protruding pins are formed at the inner sides of the respective lock portions j situated towards the respective support portions q, that is, at the sides facing their respective other lock portions j. The pins are cam followers t' which come into contact with the cams y for rotating the lock portions j (see FIGS. 31 to 35).

When the tape cassette b is loaded into a tape drive device, an insertion pin h of the tape drive device is inserted into a cassette shell c from a rectangular hole g of the cassette shell c, and comes into contact with an inclined surface p defining a pin insertion recess o of a slider i (see FIG. 26(B)).

When the insertion pin h is further inserted into the pin insertion recess o of the slider i, the front end of the insertion pin h pushes the inclined surface p, so that the slider i moves towards the back against the biasing force of the slide spring 1 (see FIG. 27).

The cam followers t' and t' of the respective lock portions j and j come into contact with the respective cams y and y, and move towards the back along the cams y and y, so that the lock portions j and j rotate in the direction in which the anchoring pawls r and r move towards each other. By this, the anchoring pawls r and r of the respective lock portions j and j move away from the respective tape reels e and e, so that the tape reels e and e are unlocked, and are brought into a rotatable state (see FIGS. 31 to 35).

FIGS. 31 to 35 are enlarged plan views showing states of the reel lock mechanism a' in which a tape reel e changes from a locked state to an unlocked state.

The reel lock mechanisms a and a' of the above-described related tape cassettes b have the following problems ② to ③.

① The tape cassette b cannot be reduced in size.

② The elastic force of the lock spring k cannot be made small, so that the tape reels cannot be stably locked.

③ When the tape reels e are unlocked, the tape reels e rotate in the direction in which the magnetic tape d is made slack, so that the magnetic tape d may become entangled with a member of the tape drive device.

First, problem ① will be explained with reference to the related reel lock mechanism a described earlier.

When the tape cassette b is made small, there is a problem in that the related reel lock mechanism a cannot be disposed in a small triangular space.

In other words, when the tape cassette b is reduced in size; the triangular space naturally becomes smaller, so that the sliding amount of the slider i becomes smaller. On the other hand, the amount of displacement of the anchoring pawls r and r of the respective lock portions j and j required to unlock the tape reels e and e (distance of movement of the anchoring pawls r and r away from the respective tape reels e and e) do not change very much even if the tape cassette b becomes smaller, so that the amount of displacement needs to be substantially the same as the amount of displacement of the anchoring pawls r and r of the related reel lock mechanism a.

Therefore, in order to make the amount of displacement of the anchoring pawls r the same regardless of a reduction in the sliding amount of the slider i, the pressure angles between the cams y and the respective cam followers t must be made large. When the pressure angles are increased, a large force needs to be exerted upon the cam followers t in order to rotate the respective lock portions j, so that the slider i and the lock portions j cannot move smoothly. As a result, stable locking and unlocking of the tape reels e cannot be performed.

The pressure angles are angles formed at portions of contact of the respective cams y and their respective cam followers t by normal lines T1 to the cams y and movement directions T2 of the cam followers t (directions of tangential lines to the cam followers t with respect to rotational centers O) (see FIGS. 29 and 30).

FIGS. 29 and 30 are schematic views for comparing the relationships between the pressure angles and the sliding amount of the slider i when the amount of displacement of the anchoring pawls r of their respective lock portions j is made constant.

FIG. 29 schematically shows the relationships in the related reel lock mechanism a, in which, when the sliding amount of the slider i is σ and the displacement amount of the anchoring pawls is δ, the pressure angles between the cams y and the corresponding cam followers t are α.

On the other hand, FIG. 30 shows the relationships in the reel lock mechanism where the sliding amount of the slider i is reduced due to a size reduction in the tape cassette b. Here, in the case where the sliding amount of the slider i is reduced to σ', which is substantially half the sliding amount σ of the slider i shown in FIG. 29, when the displacement amounts of the anchoring pawls r of the lock portions j are kept equal to the displacement amount Δ, the pressure angles between the cams y and the respective cam followers t become α'.

Therefore, it can be understood that, when the sliding amount of the slider i becomes smaller due to a size reduction of the tape cassette b, the pressure angles between the cams y and the respective cam followers t become large (α'>α), so that the reel lock mechanism a either cannot move smoothly or cannot easily move smoothly.

Problem ② will be explained with reference to the related reel lock mechanism a. The lock portions j are supported by the slider i in a cantilever manner, so that, when they are subjected to shock, they tend to rotate with the support portions q as centers. Therefore, a larger force is required to keep the tape reels e in a locked state.

More specifically, the lock portions j of the reel lock mechanism a are supported at the support portions q at one end of the lock portions j by the support shafts m of the slider i. Therefore, in the case where the anchoring pawls r are engaged with and locked at an engaging tooth f and an engaging tooth f of the respective tape reels e, if a shock is exerted upon the lock portions j when, for example, the tape cassette b is dropped, the lock portions j try to rotate with the support portions q as centers. When the tape cassette b is dropped, a shock of 500 G to 1000 G is ordinarily exerted, so that a large rotational force is generated at the lock portions j supported in a cantilever manner.

Obviously, it is necessary to assume that the tape cassette b may be dropped at the time the tape cassette b is being designed. Thus, it is necessary to design the tape cassette b so that the lock spring k has a high elastic force in order to prevent the tape reels from becoming unlocked when the tape cassette b is dropped.

Therefore, the contact pressures between the cams y and the respective cam followers t become larger, so that repeated sliding causes serious wearing of the contact surfaces of the cams y and the respective cam followers t, thereby causing both contact surfaces to become rough. This results in the problem of making it more difficult to smoothly move the reel lock mechanism a.

In order to prevent this, for example, the pressure angles may be made smaller, or the coefficient of friction between the materials of the contact surfaces may be made smaller. However, the former goes against size reduction of the tape cassette b as mentioned above, and the latter results in increased costs, so that these cannot serve as solutions.

Problem ③ is described with reference to the related reel lock mechanism a'. When the tape reels e are unlocked, the tape reels e rotate in the direction in which the magnetic tape d becomes slack, so that the portion of the magnetic tape d outside the cassette shell c becomes slack. Accordingly, after loading the tape cassette b into the tape drive device, the slack magnetic tape d may cause troubles such as the tape path not being properly formed or the magnetic tape d becoming entangled with a member of the tape drive device.

Each tape reel e is in a locked state when the front end of its anchoring pawl r is positioned at a corner of a recess f1 of each tape reel e situated at a side towards which each tape reel e winds up the magnetic tape d (this direction hereinafter referred to as "forward," and the opposite direction hereinafter referred to as "backward" in terms of the tape reels 3) (see FIG. 31). In this state, when the slider i moves backward, each anchoring pawl r is caught by a protrusion f2 behind the adjacent recess f1 where the anchoring pawl r is positioned (in FIG. 32, the anchoring pawl r is shown as being caught by the protrusion f2 marked with a dot) (see FIG. 32). Further backward movement of the slider i causes each protrusion f2 which has caught its anchoring pawl r to move backward, so that each tape reel e rotates in the direction in which the magnetic tape d becomes slack (see FIG. 33).

Accordingly, the present invention makes it possible to overcome the above-described problems ① to ③ in order to reduce the size of a tape cassette, to stabilize locking of a tape reel, to prevent reverse rotation of the tape reel when the tape reel is unlocked to minimize slacking in a magnetic tape.

DISCLOSURE OF INVENTION

To overcome the above-described problems, the present invention provides a reel lock mechanism of a tape cassette for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Loading of the tape cassette into a tape drive device causes the slider to withdraw and the lock portions to rotate in directions in which the lock portions move away from the respective tape reels in order to unlock the tape reels. Each lock portion has a front portion including an anchoring pawl which engages the tape reel and a back portion extending in a direction substantially opposite to the front portion with a support portion supported by the slider serving as center. When the slider withdraws, the back portion of each lock portion comes into contact with the inside surface of the back wall of the cassette shell and each lock portion rotates in an unlocking direction, so that each anchoring pawl separates from the tape reel.

The present invention provides a tape cassette comprising a reel lock mechanism for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Loading of the tape cassette into a tape drive device causes the slider to withdraw and the lock portions to rotate in directions in which the lock portions move away from the respective tape reels in order to unlock the tape reels. Each lock portion has a front portion including an anchoring pawl which engages the tape reel and a back portion extending in a direction substantially opposite to the front portion with a support portion supported by the slider serving as center. When the slider withdraws, the back portion of each lock portion comes into contact with the inside surface of the back wall of the cassette shell and each lock portion rotates in an unlocking direction, so that each anchoring pawl separates from the tape reel.

Accordingly, in the reel lock mechanism of tape reels and the tape cassette, since the reel lock mechanism is provided in a back-wall-side portion, or wider portion, of the space between the two tape reels and the inside surface of the back wall of the cassette shell, it is possible to relatively easily design the reel lock mechanism in terms of orientations of the back portions of the lock portions from the support portions. By this, it is possible to smoothly move the reel lock mechanism by reducing the contact angles between the back side portions and the back wall, that is, the pressure angles.

Since the lock portions of the reel lock mechanism comprises support portions and front and back portions extending in substantially opposite directions from the support portions, even if a person accidentally drops the tape cassette, rotational forces acting in opposite directions are produced at the front and back portions, so that the rotational forces acting in both directions cancel each other. Thus, rotational forces are not produced at the lock portions as a whole. Even if rotational forces are produced, the rotational forces can be made very small. Therefore, it is possible to reduce the contact pressures between the back portions of the lock portions and the back wall by setting the elastic force of the lock spring to a small value, thereby making it is possible to reduce the wear on both contact surfaces of the back portions of the lock portions and the back wall, as a result of which the reel lock mechanism can be smoothly operated for a long period of time. In addition, it is not necessary to use a special material for the contact surfaces, so that costs are not increased.

To overcome the above-described problems, the present invention provides another reel lock mechanism of a tape cassette for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Engagement of an engaging pawl of each lock portion with engaging teeth of the tape reel by a forward movement of the slider causes each tape reel to be locked, or, loading of the tape cassette into a tape drive device causes the slider to withdraw and each lock portion to rotate away from the tape reel, so that each tape reel is unlocked. The engaging teeth are formed by recesses and protrusions alternately provided at the peripheral edge of each tape reel, with the bottom surface defining each recess having a central portion which protrudes in a chevron shape or a corner of each protrusion having an inclined surface. An end portion of each anchoring pawl has a flat surface that comes into contact with one inclined surface of the bottom surface defining a recess and an inclined surface of a protrusion disposed adjacent to the one inclined surface of the bottom surface defining the recess through another inclined surface of the bottom surface defining the recess, the inclined surface of the protrusion being situated adjacent the recess.

The present invention provides another tape cassette comprising a reel lock mechanism for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Engagement of an engaging pawl of each lock portion with engaging teeth of the tape reel by a forward movement of the slider causes each tape reel to be locked, or, loading of the tape cassette into a tape drive device causes the slider to withdraw and each lock portion to rotate, so that each tape reel is unlocked. The engaging teeth are formed by recesses and protrusions alternately provided at the peripheral edge of each tape reel, with the bottom surface defining each recess having a central portion which protrudes in a chevron shape or a corner of each protrusion having an inclined surface. An end portion of each anchoring pawl has a flat surface that comes into contact with one inclined surface of the bottom surface defining a recess and an inclined surface of a protrusion disposed adjacent to the one inclined surface of the bottom surface defining the recess through another inclined surface of the bottom surface defining the recess, the inclined surface of the protrusion being situated adjacent the recess.

Accordingly, with regard to the different reel lock mechanism of tape reels and the different tape cassette of the invention, when the slider is moved backward as a result of loading the tape cassette into a tape drive device, the anchoring pawls of the respective lock portions are not caught by the protrusions of the engaging teeth of the tape reels, so that the tape reels are not rotated when the lock portions withdraw, thereby keeping the tape-shaped recording medium in a tensioned state.

Therefore, when the tape cassette is loaded into a tape drive device, it is possible to prevent, for example, improper formation of a tape path or entangling of the tape-shaped recording medium with a member of the tape drive device by a slack in the tape-shaped recording medium.

BRIEF DESCRIPTION OF THE DRAWINGS

FIGS. 6(A) and 6(B) are an enlarged plan view and an enlarged sectional view thereof, respectively, and show a locked state of a tape reel.

FIGS. 25(A) and 25(B) are an enlarged plan view and an enlarged sectional view thereof, respectively, and show a locked state of the tape reel.

BEST MODE FOR CARRYING OUT THE INVENTION

Figure 1:
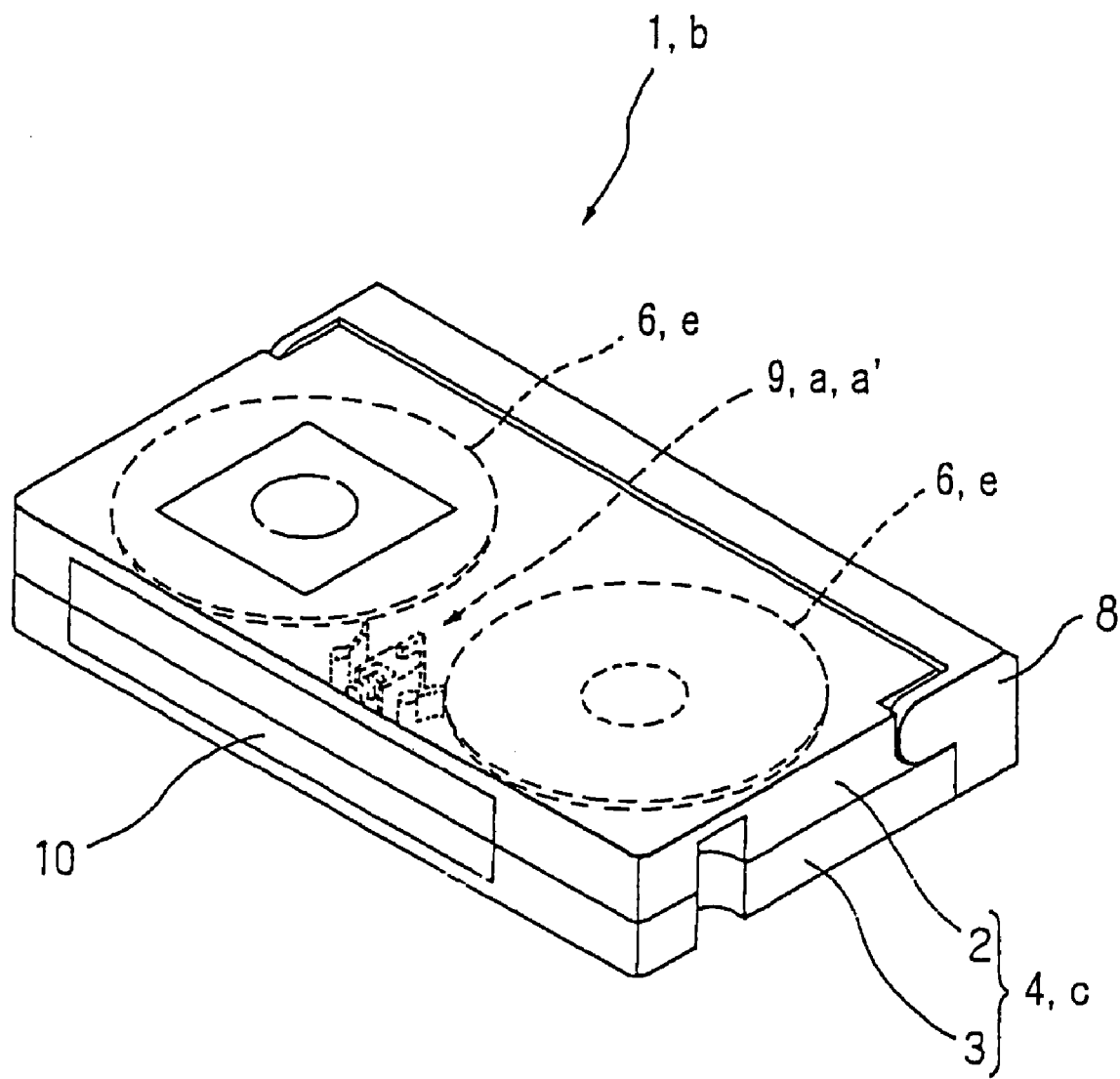
FIG. 1 illustrates, along with FIGS. 2 to 10, a tape cassette and a reel lock mechanism of the tape cassette of a first embodiment of the present invention. These figures are schematic perspective views showing the tape cassette from the front side thereof.

Hereunder, a reel lock mechanism of a tape cassette and a tape cassette using the reel lock mechanism will be described in accordance with each embodiment shown in the attached drawings.

FIGS. 1 to 10 illustrate a reel lock mechanism of a tape cassette and a tape cassette using the reel lock mechanism of a first embodiment of the present invention.

A tape cassette 1 comprises a cassette shell 4 formed by a top shell 2 and a bottom shell 3. Two tape reels 6 and 6 upon which a magnetic tape 5 is wound are rotatably accommodated inside the cassette shell 4. A plurality of engaging teeth 7, 7, . . . , serving as protrusions, are formed at the peripheral edges of lower flanges 6' and 6' of the respective tape reels 6 and 6, with recesses being formed therebetween (see FIGS. 1, 2, and 5).

Figure 2:
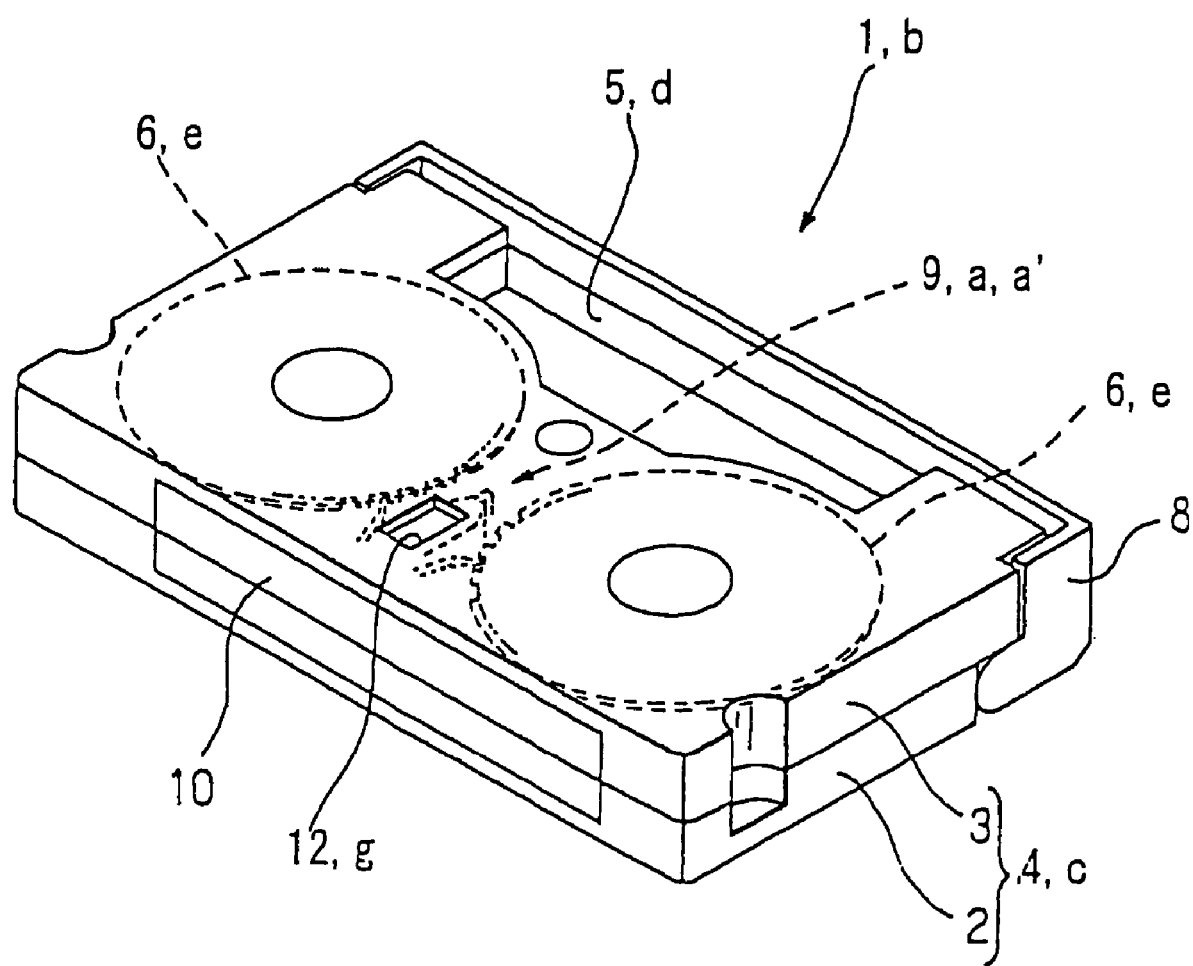
FIG. 2 is a schematic perspective view showing the tape cassette from the back side thereof.

A front lid 8 for covering the front surface of the magnetic tape 5 positioned along the front surface of the cassette shell 4 is rotatably supported at the front end of the cassette shell 4 (see FIGS. 1 and 2).

A reel lock mechanism 9 is provided in a substantially triangular space (hereinafter referred to as "the triangular space"), defined by a back wall 10 and the two tape reels 6 and 6, inside the cassette shell 4. A rectangular hole 12 is formed in a portion of the bottom surface of the bottom shell 3 where the reel lock mechanism 9 is situated. When the tape cassette 1 is loaded into a tape drive device, an insertion pin 13, provided at the tape drive device, is inserted into the cassette shell 4 from the rectangular hole 12, and acts on the reel lock mechanism 9 in order to unlock the tape reels 6 and 6 (see FIGS. 6 to 9).

Figure 3:
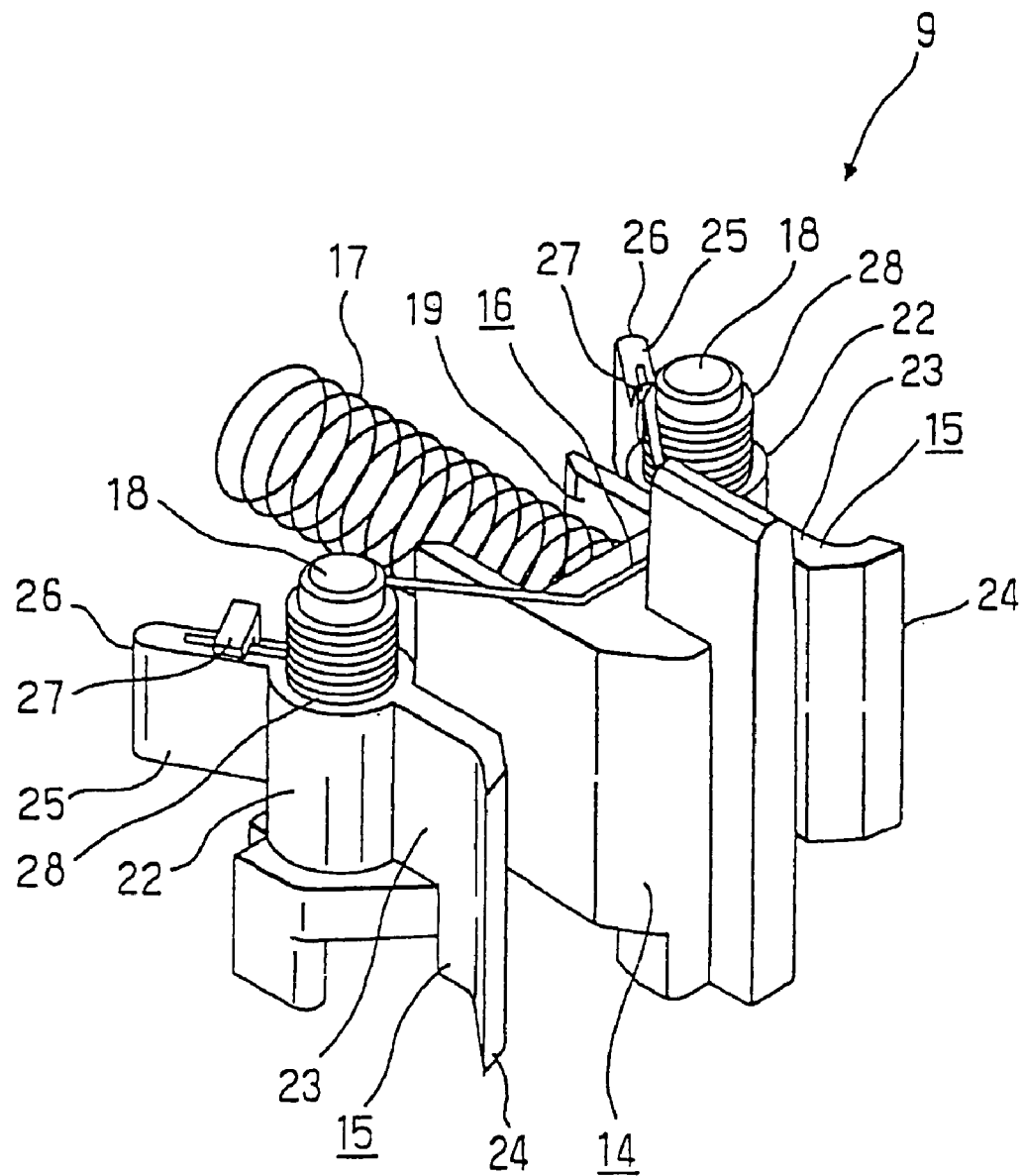
FIG. 3 is an enlarged perspective view of the reel lock mechanism.
Figure 4:
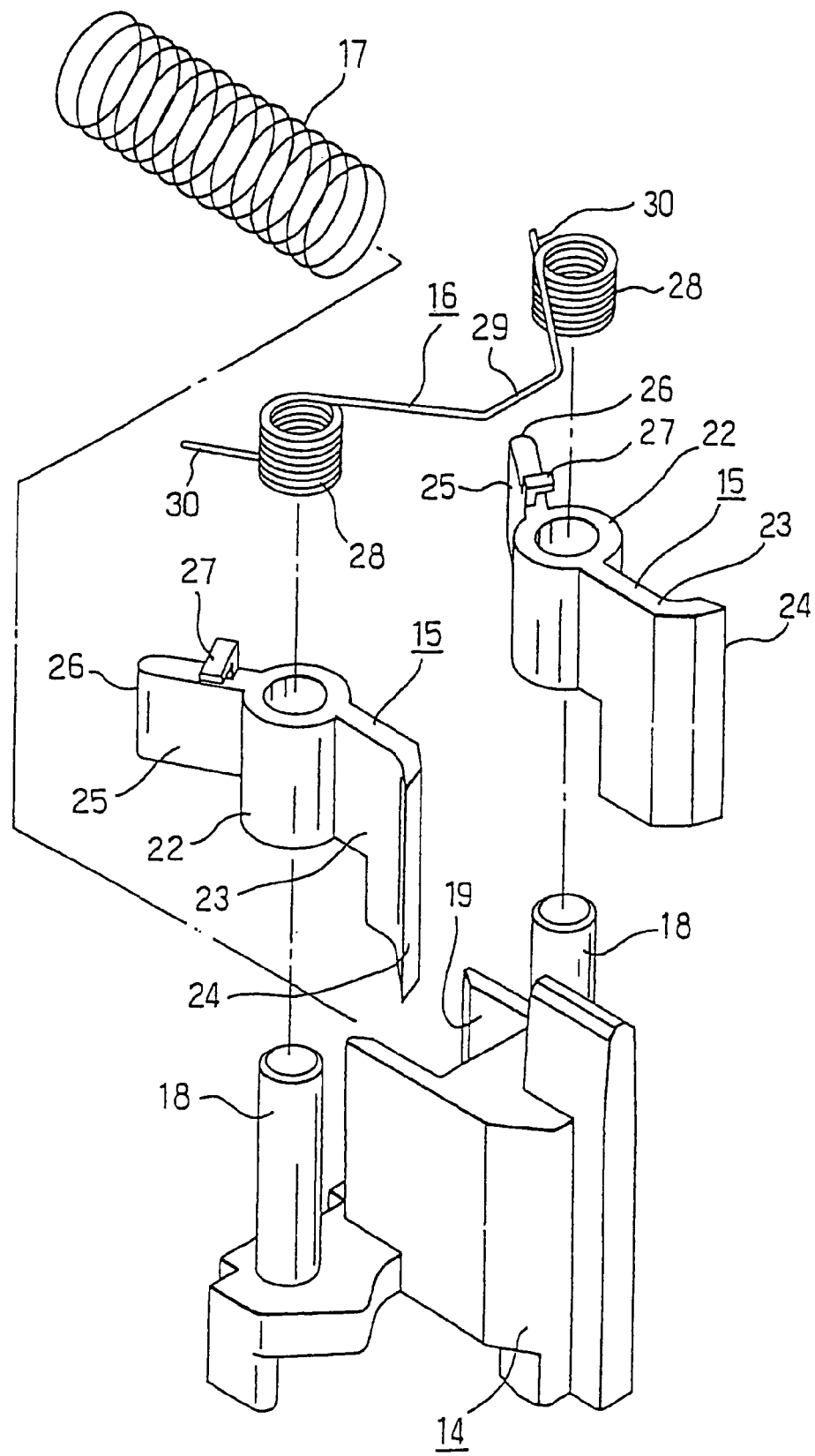
FIG. 4 is an enlarged exploded perspective view of the reel lock mechanism.
Figure 5:
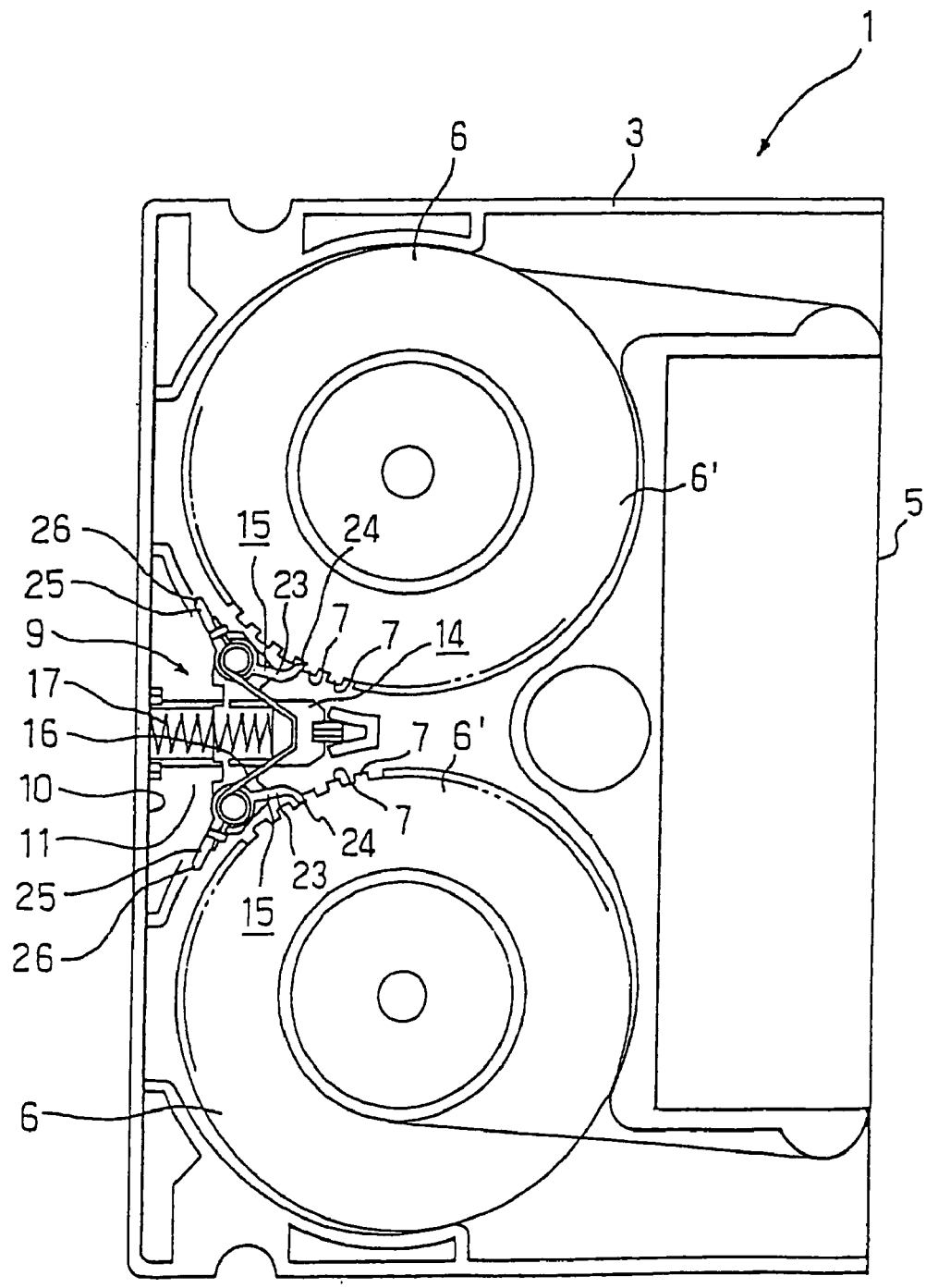
FIG. 5 is a schematic plan view showing a state in which a top shell of the tape cassette is removed.

The reel lock mechanism 9 comprises a slider 14, two lock portions 15 and 15, a lock spring 16, and a slide spring 17 (see FIGS. 3 and 4).

The slider 14 is disposed so as to be movable forward and backward at the bottom shell 3. Upwardly protruding support shafts 18 and 18, which are separated in the leftward and rightward directions, are provided at the back end of the slider 14. A placement recess 19, which opens upward and backward, is formed between the support shafts 18 and 18 of the slider 14 (see FIGS. 3, 4, and 5).

A pin insertion recess 20, which opens at the bottom surface, for inserting the insertion pin 13 of the tape drive device is formed in a portion of the slider 14 situated forwardly of the placement recess 19, and the lower half of the back surface defining the pin insertion recess 20 is an inclined surface 21 which is displaced backward as it extends downward (see FIGS. 6 to 9).

Figure 23:
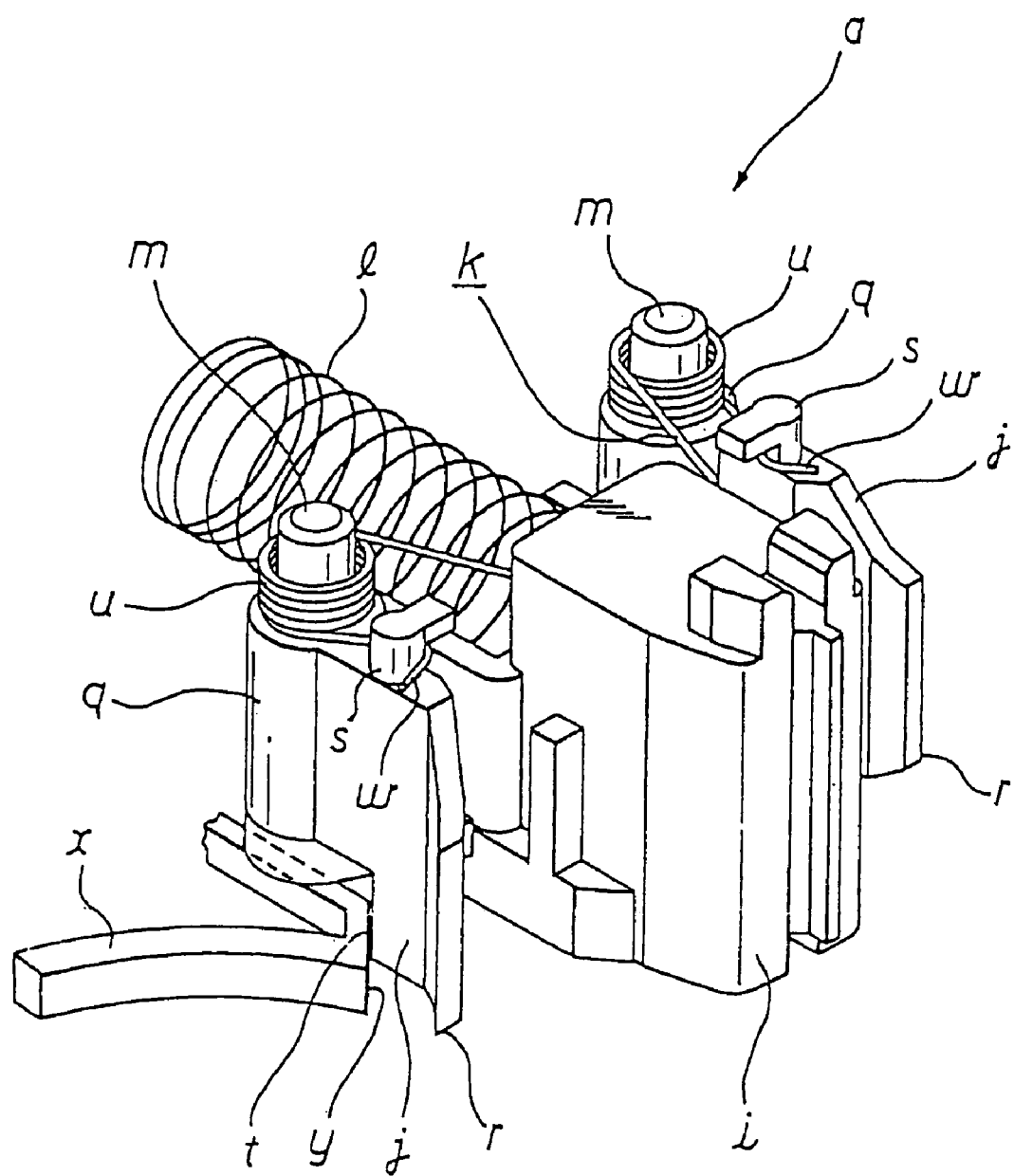
FIG. 23 illustrates, along with FIGS. 24 to 30, a related reel lock mechanism, and is an enlarged perspective view thereof.
Figure 24:
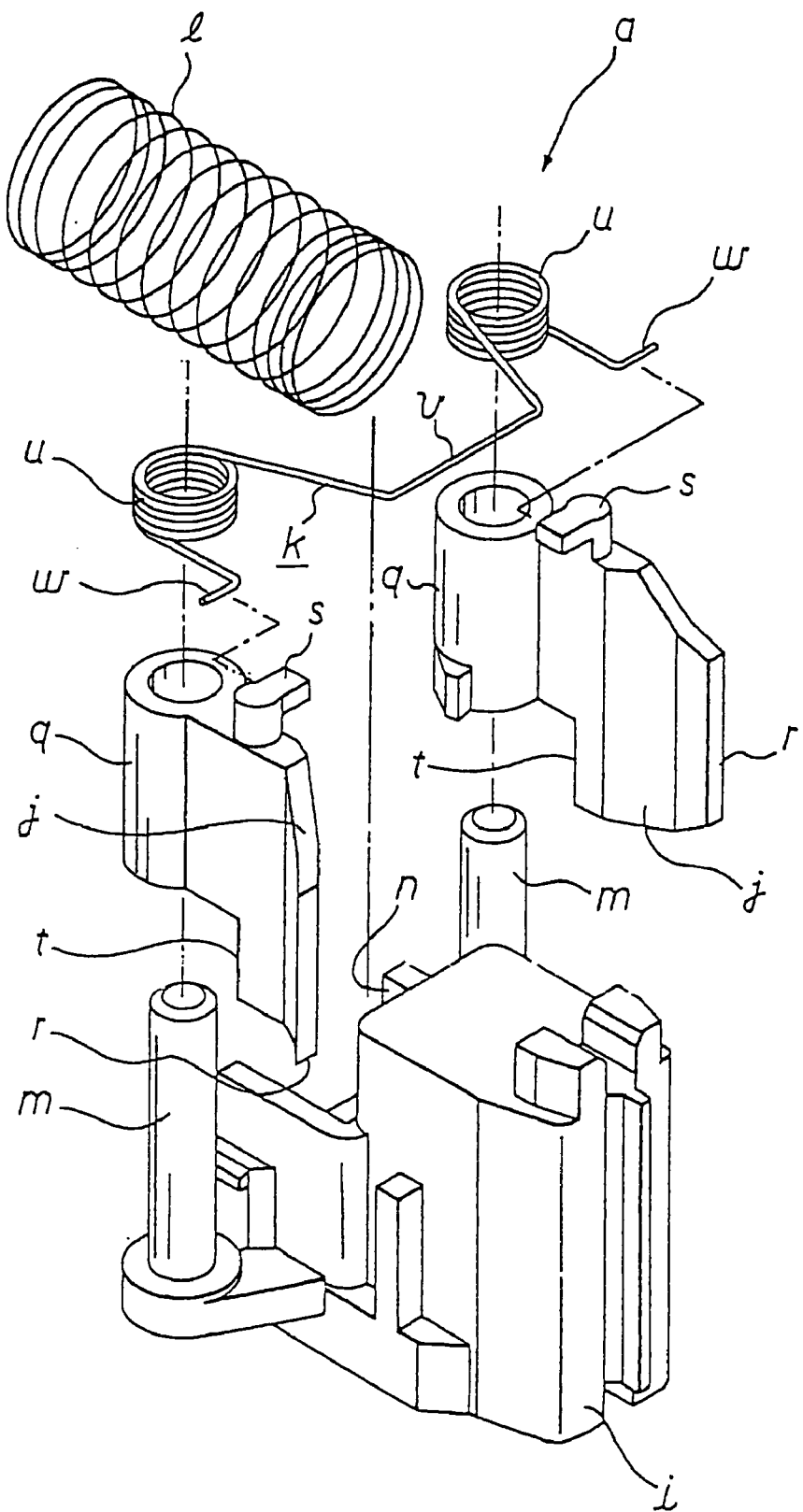
FIG. 24 is an enlarged exploded perspective view of the reel lock mechanism.
Figure 25:
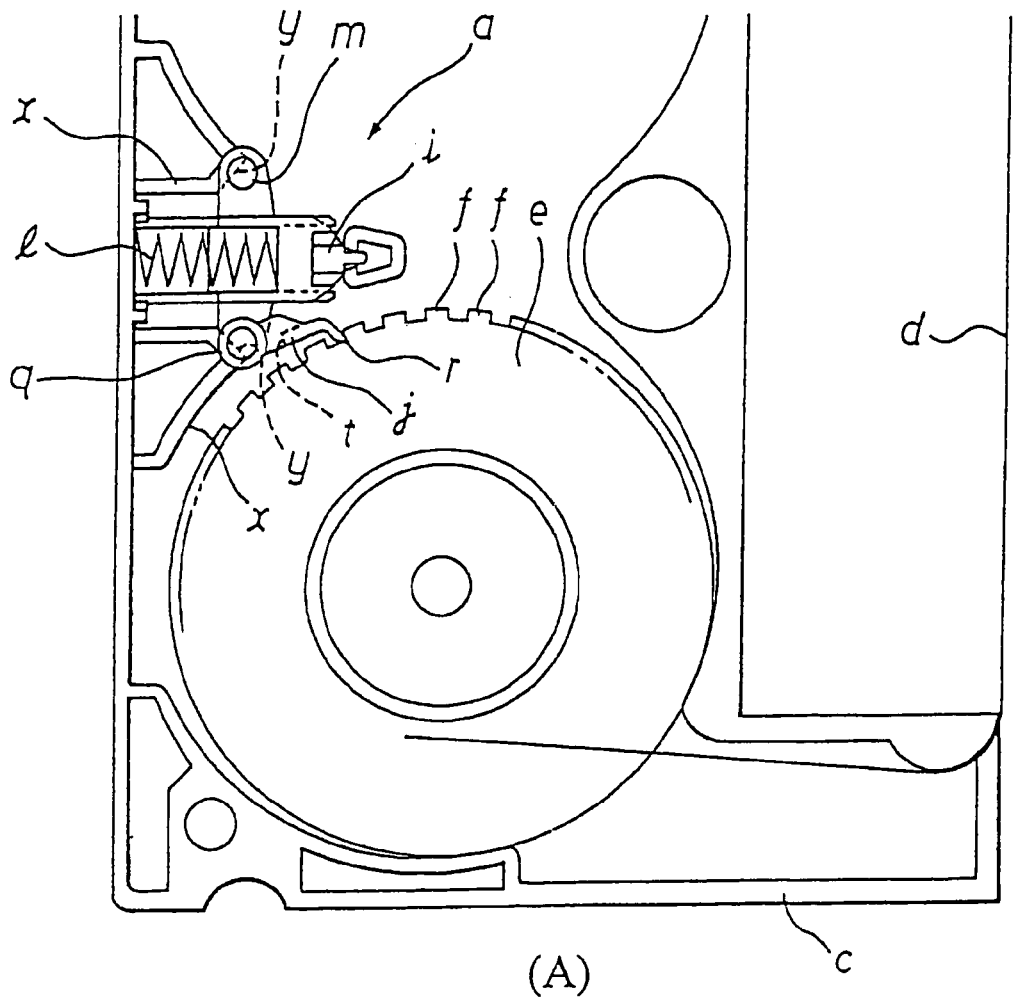
FIGS. 25(A) and 25(B) illustrate, along with FIGS. 26 to 28, the movements of the reel lock mechanism in turn.
Figure 25:
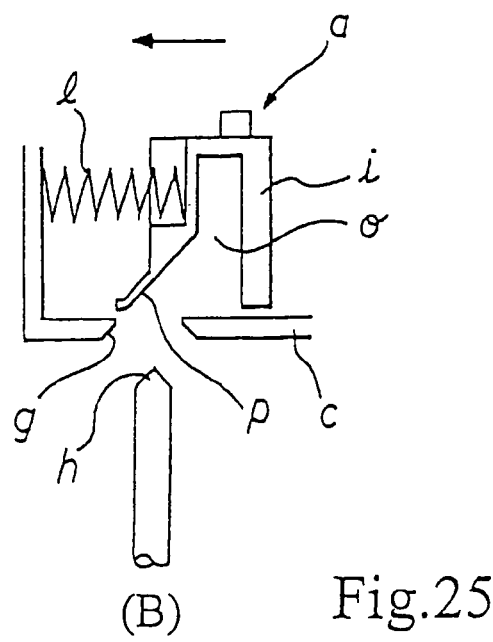
Figure 26:
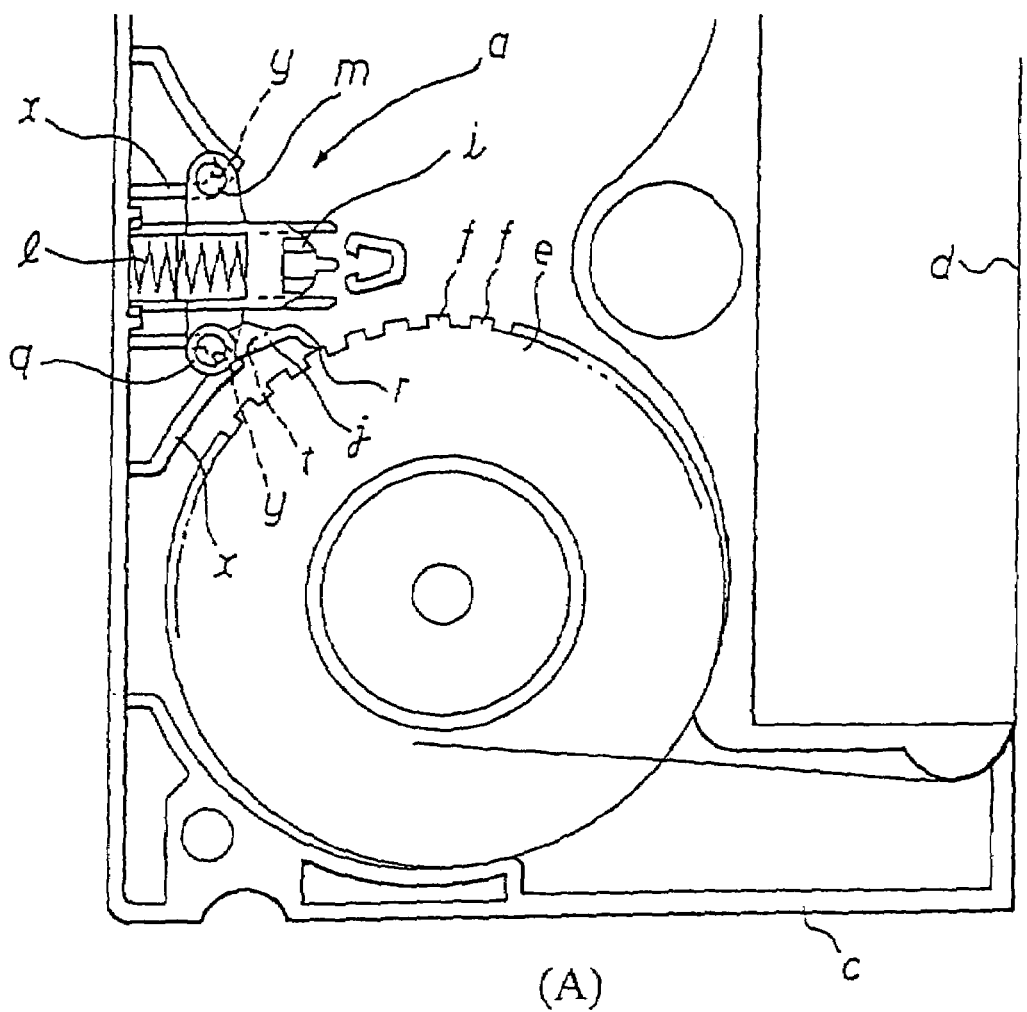
FIGS. 26(A) and 26(B) show a state in which a cam follower is in contact with a cam.
Figure 26:
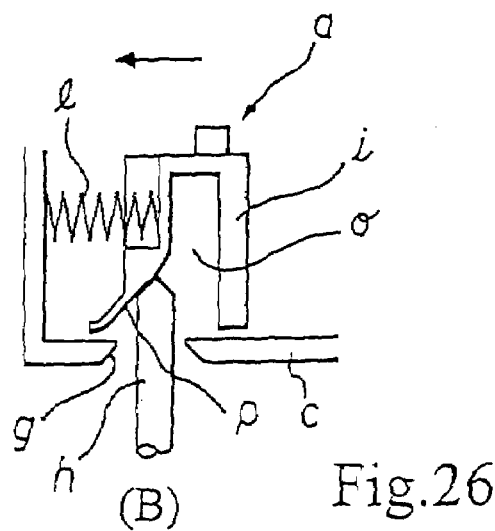
Figure 27:
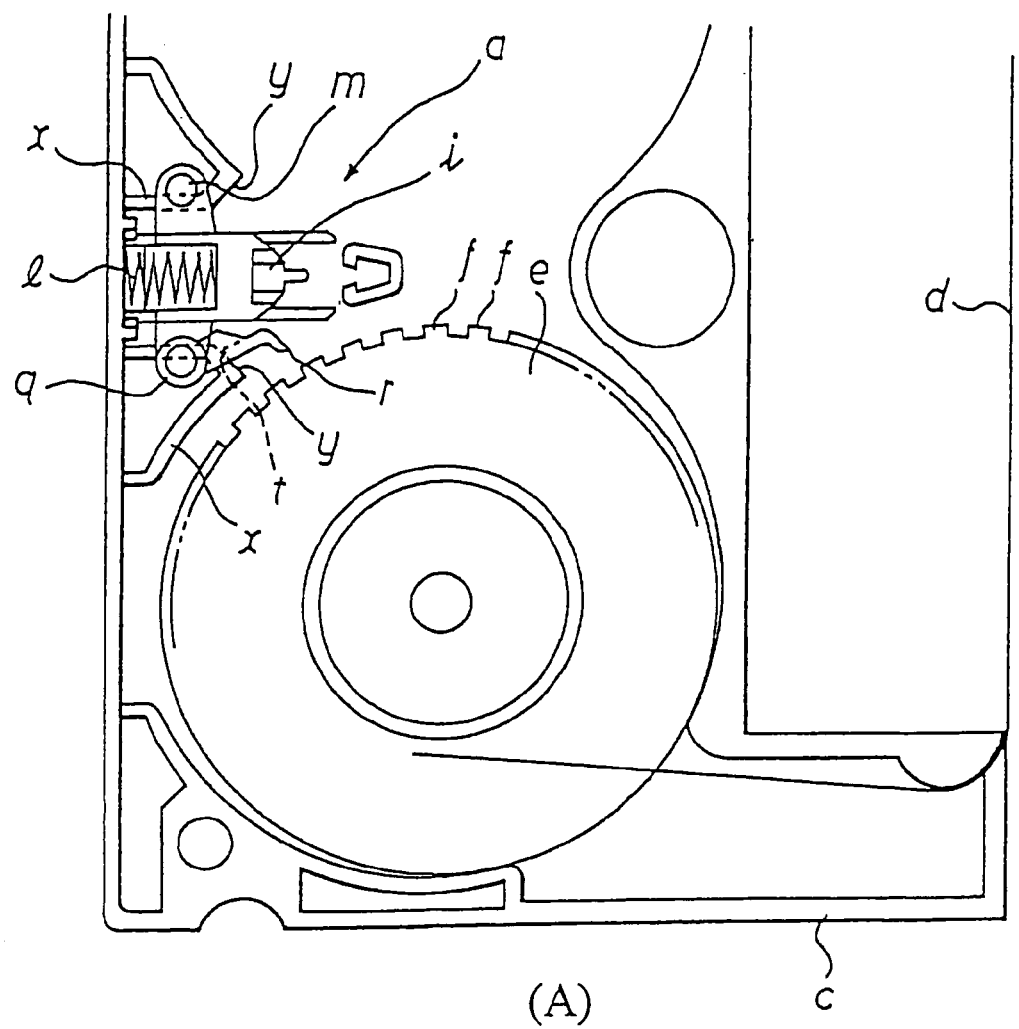
FIGS. 27(A) and 27(B) show a state in which a lock portion is separated from the tape reel.
Figure 27:
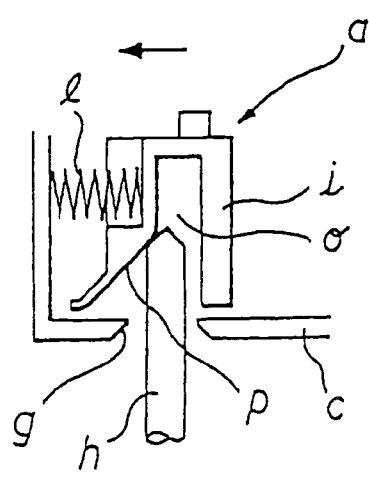
Figure 28:
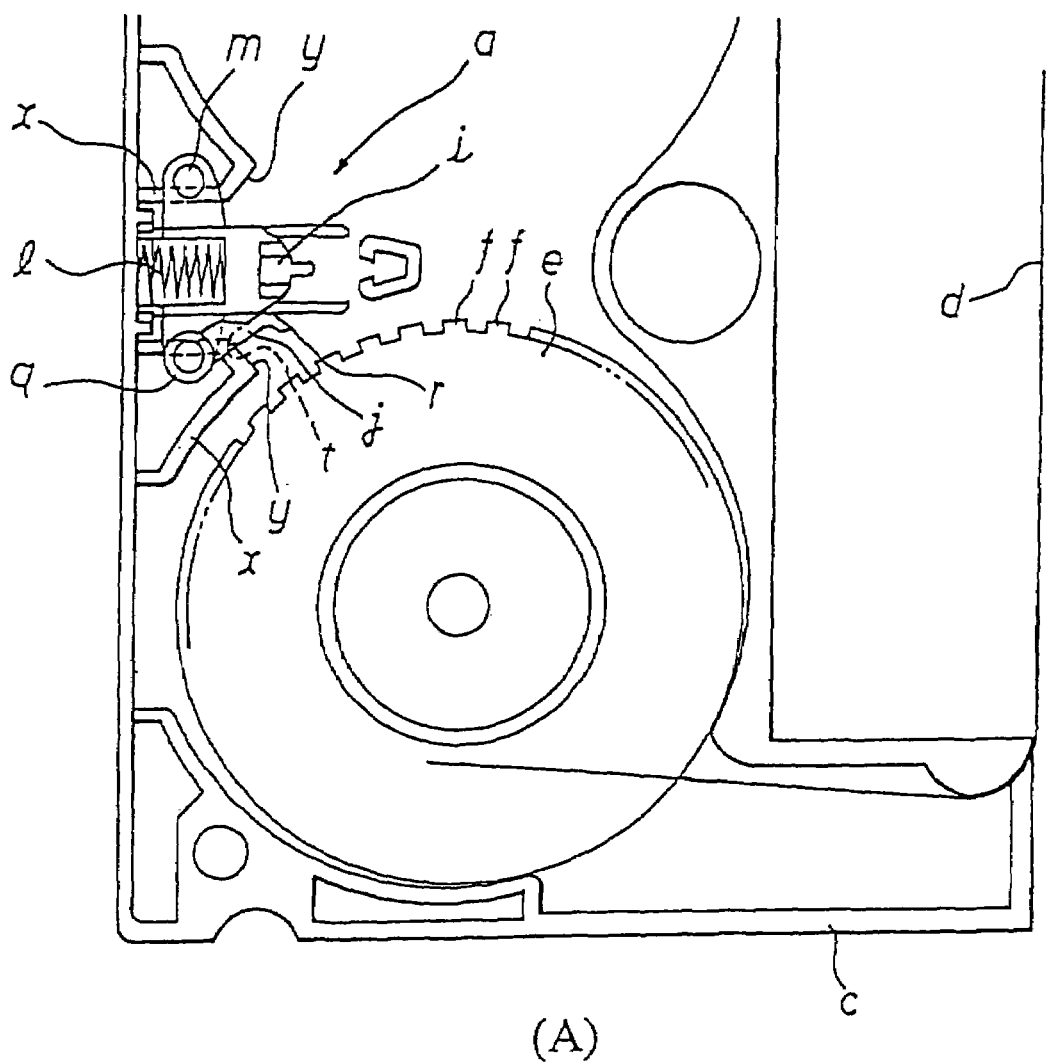
FIGS. 28(A) and 28(B) show a completely unlocked state.
Figure 28:
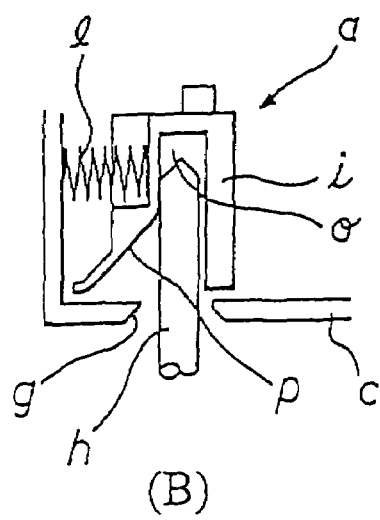
Figure 29:
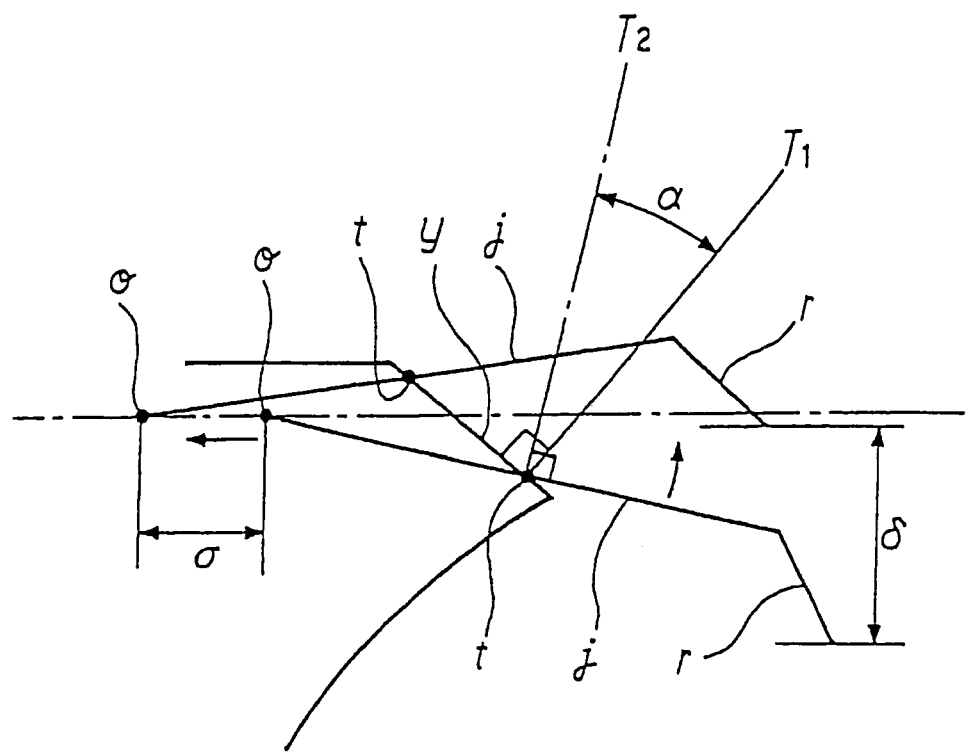
FIG. 29 illustrates, along with FIG. 30, a pressure angle, and is a schematic plan view for illustrating the pressure angle of the related reel lock mechanism.
Figure 30:
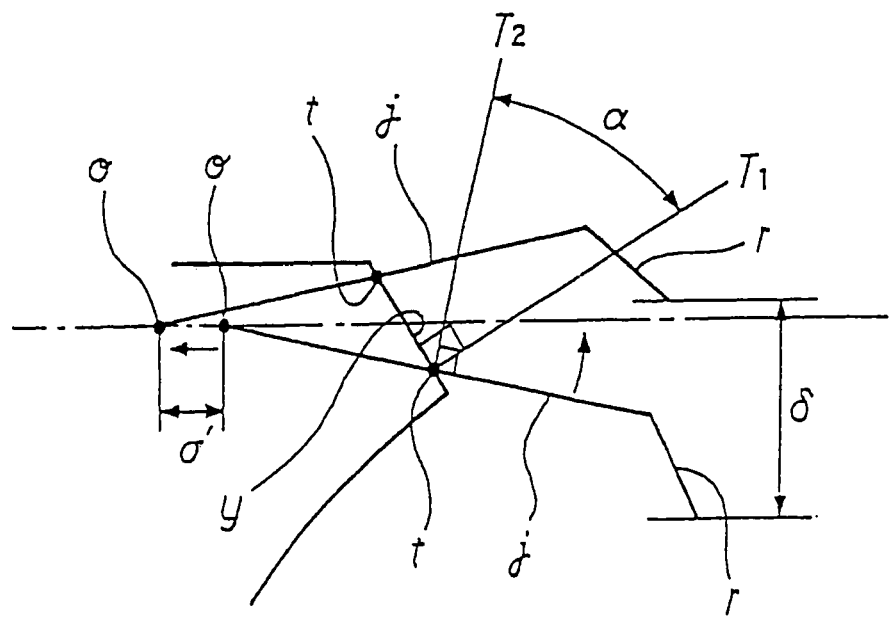
FIG. 30 is a schematic plan view for illustrating the pressure angle when the related reel lock mechanism is reduced in size.
Figure 31:
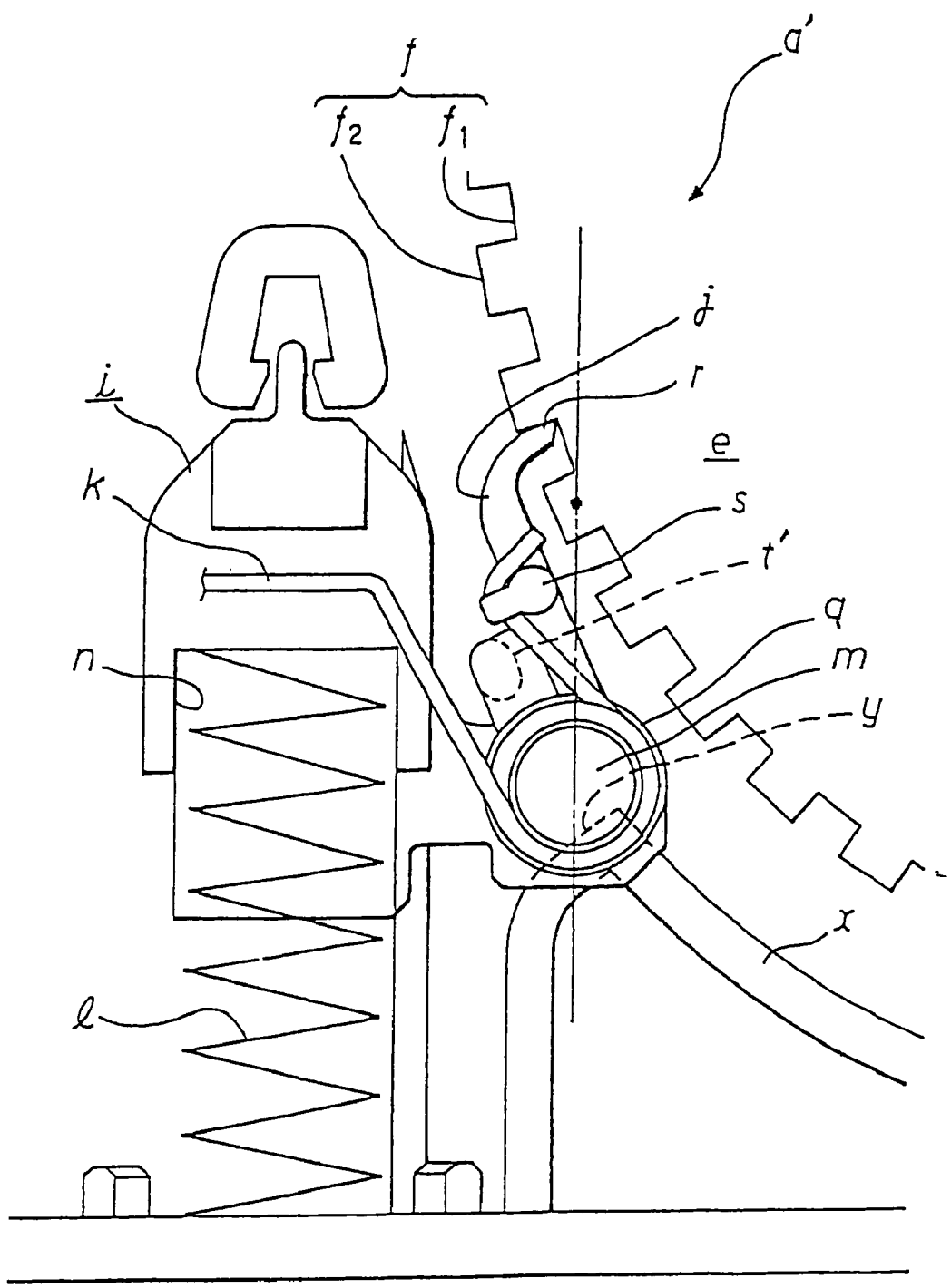
FIG. 31 is, along with FIGS. 32 to 35, an enlarged plan view for illustrating the movements of another related reel lock mechanism in turn, and shows a locked state.
Figure 32:
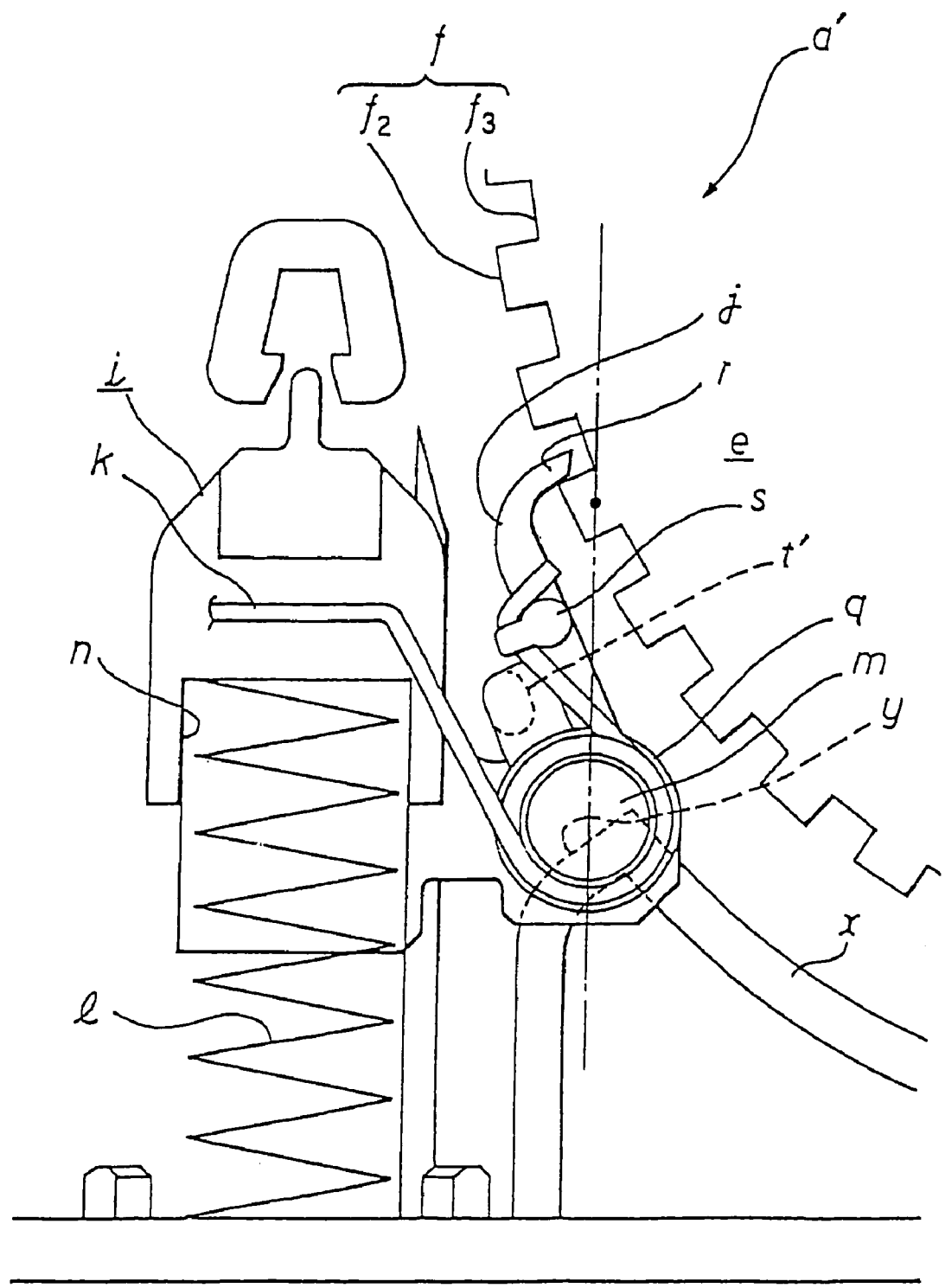
FIG. 32 shows a state in which an engaging pawl is caught by a protrusion as a result of slight withdrawal of a lock portion from the position shown in FIG. 31.
Figure 33:
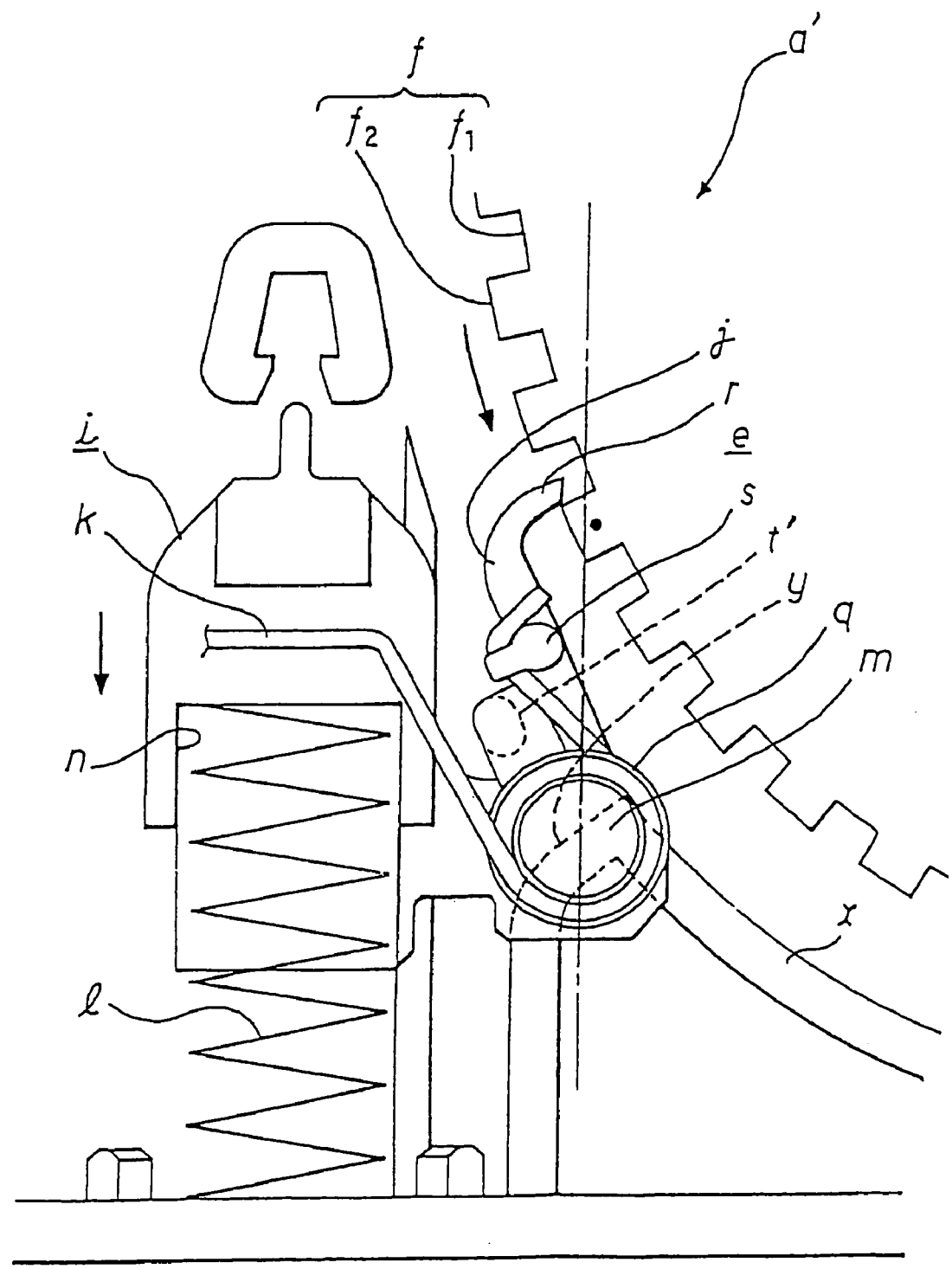
FIG. 33 shows a state in which the tape reel is rotated by causing the engaging pawl to be caught by a protrusion as a result of slight withdrawal of the lock portion from the position shown in FIG. 32.
Figure 34:
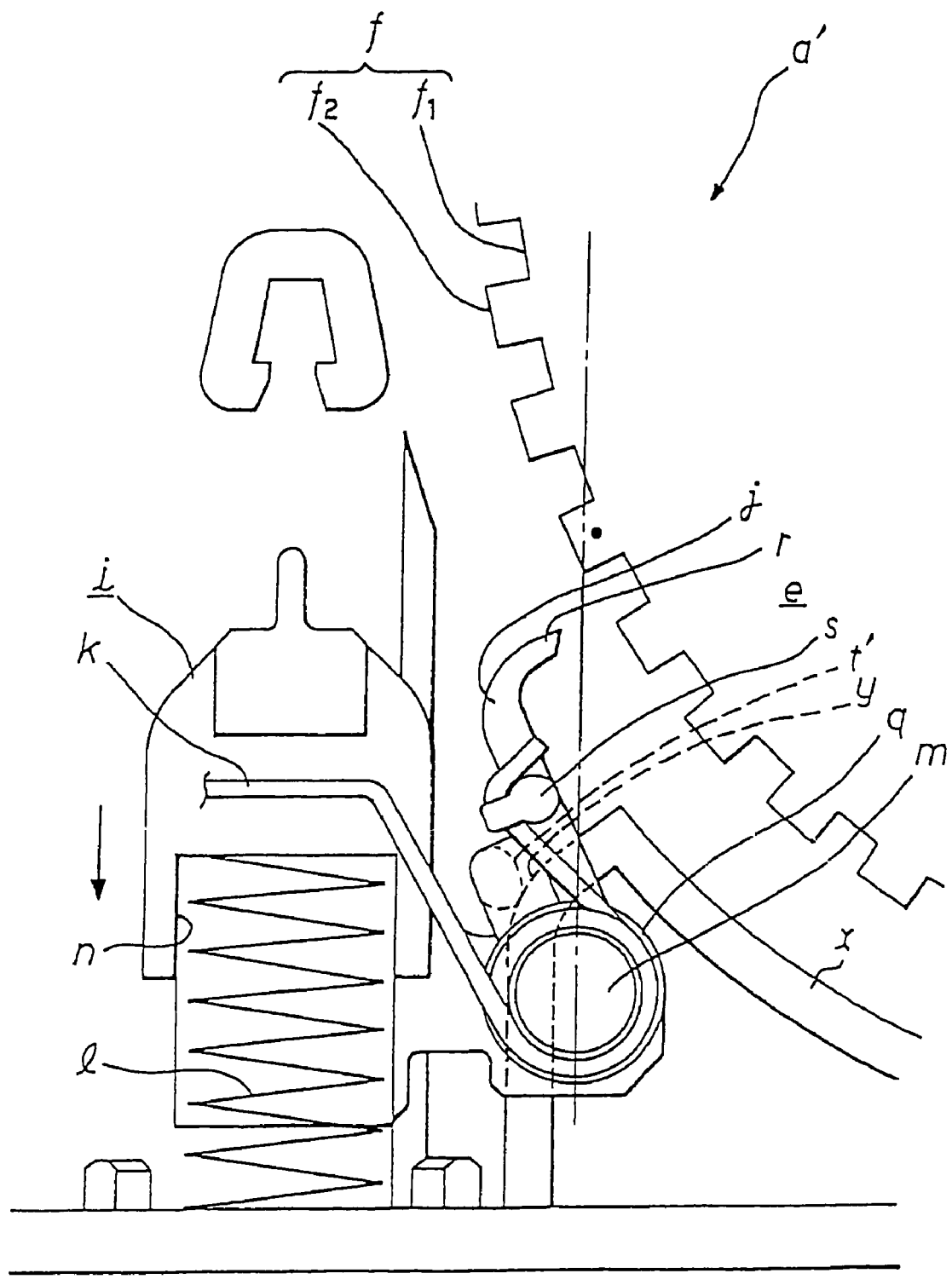
FIG. 34 shows a state in which a cam follower is in contact with a cam as a result of withdrawal of the lock portion from the position shown in FIG. 33.
Figure 35:
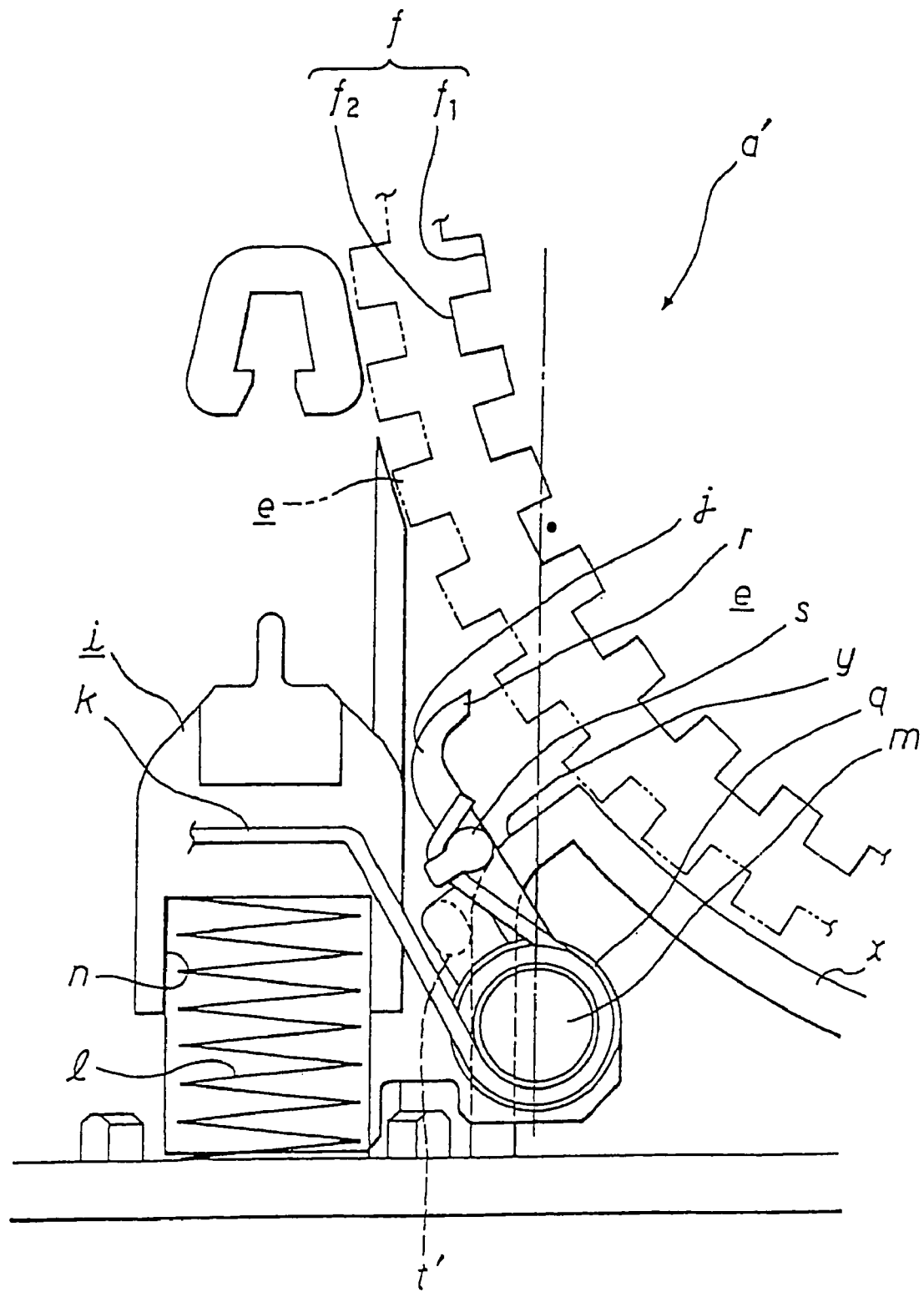
FIG. 35 shows a completely unlocked state as a result of withdrawal of the lock portion from the position shown in FIG. 34.

Two lock portions 15 and 15 are symmetrical in form, and have substantially chevron shapes as a whole in plan view. Vertically extending cylindrical support portions 22 and 22 are integrally formed with bent portions of the respective lock portions 15 and 15. Portions 23 and 23 of the respective lock portions 15 and 15 situated forwardly of the respective support portions 22 and 22 (hereinafter referred to as "the front portions") extend away from each other, with tapered anchoring pawls 24 and 24 being formed at the front ends of the front portions 23 and 23 (see FIGS. 23 and 24).

Portions 25 and 25 of the two lock portions 15 and 15 situated behind the support portions 22 and 22 (hereinafter referred to as "the back portions") extend away from each other, with the back ends of the back portions 25 and 25 being cam followers 26 and 26 which come into contact with the back wall 10 of the cassette 4 in order to rotate the lock portions 15 and 15 in opposite directions. Spring catch portions 27 and 27 are integrally formed with the top side edges of the respective lock portions 15 and 15 between the support portions 22 and 22 and the respective anchoring pawls 26 and 26 (see FIGS. 3 and 4).

Externally fitting the support portions 22 to support shafts 18 of the slider 14 rotatably supports the lock portions 15 by the slider 14. In this way, the lock portions 15 are formed so that the front portions 23 and the back portions 25 extend in substantially opposite directions with the support portions 22 serving as centers (see FIG. 5).

The lock spring 16 is a torsion coil spring, in which coil portions 28 and 28, a linking portion 29 linking the coil portions 28 and 28, and engaging portions 30 and 30 are integrally formed, with the coil portions 28 and 28 being separated in the leftward and rightward directions and the engaging portions 30 and 30 protruding from their respective coil portions 28 and 28 and being positioned outwardly of the linking portion 29. The two coil portions 28 and 28 are supported at their respective support shafts 18 and 18 by being externally fitted to the top sides of the support portions 22 and 22 of their respective lock portions 15 and 15. The two engaging portions 30 and 30 engage the spring catch portions 27 and 27 of the two lock portions 15 and 15, so that the two lock portions 15 and 15 are biased in the directions in which the anchoring pawls 24 and 24 move away from each other, that is, in the directions in which the anchoring pawls 24 and 24 engage an engaging tooth 7 and an engaging tooth 7 of the respective tape reels 6 and 6 (see FIG. 4).

The slide spring 17 is a helical compression spring, and is provided in a compressed manner between the inside surface of the back wall 10 of the cassette shell 4 and the placement recess 19 of the slider 14. By this, the slider 14 is biased forward (see FIGS. 6 to 9).

Portions of the back wall 10 of the cassette shell 4 at the left and right sides of the portion of the back wall 10 situated in correspondence with the slider 14 are portions with which the cam followers 26 and 26 of the respective lock portions 15 and 15 come into contact and along which they slide, and are cams 31 and 31 for controlling rotation of the lock portions. 15 and 15.

When the tape cassette 1 is not loaded into a tape drive device, the slider 14 is biased maximally in the forward direction by the biasing force of the slide spring 17, and the cam followers 26 and 26 of the respective lock portions 15 and 15 are separated from the respective cams 31 and 31, so that the anchoring pawls at the front ends of the respective lock portions 15 and 15 are rotated in the directions in which they move away from each other, and the engaging pawls 24 and 24 engage an engaging tooth f and an engaging tooth f of the respective tape reels 6 and 6. By this, the tape reels 6 and 6 are brought into a locked state, that is, in a state in which the tape reels 6 and 6 are prevented from rotating (see FIG. 6).

The lock portions 15 include anti-rotation means (not shown), and are such that they do not rotate beyond a predetermined angle in the directions in which they engage the engaging teeth 7 of the tape reels. More specifically, when the slider 14 is situated slightly behind the foremost end of its movement range, the rotational angles of the lock portions 15 are angles of the order in which the front ends of the anchoring pawls 24 of the respective lock portions 15 contact the outer peripheral edges of lower flanges 6' of the respective tape reels 6. In the state shown in FIG. 7, the rotation of the anchoring pawls 24 are restricted by the anti-rotation means, so that the anchoring pawls 24 do not move towards the respective tape reels 6.

The rotation of the lock portions 15 and 15 towards their respective tape reels 6 and 6 are restricted by their respective anti-rotation means. When the slider moves to the foremost end of its movement range, the anchoring pawls 24 and 24 of the respective lock portions 15 and 15 that are disposed towards the center of the tape cassette 1 engage an engaging tooth 7 and an engaging tooth 7 of the tape reels 6 and 6, so that the tape reels 6 and 6 become locked.

Figure 6:
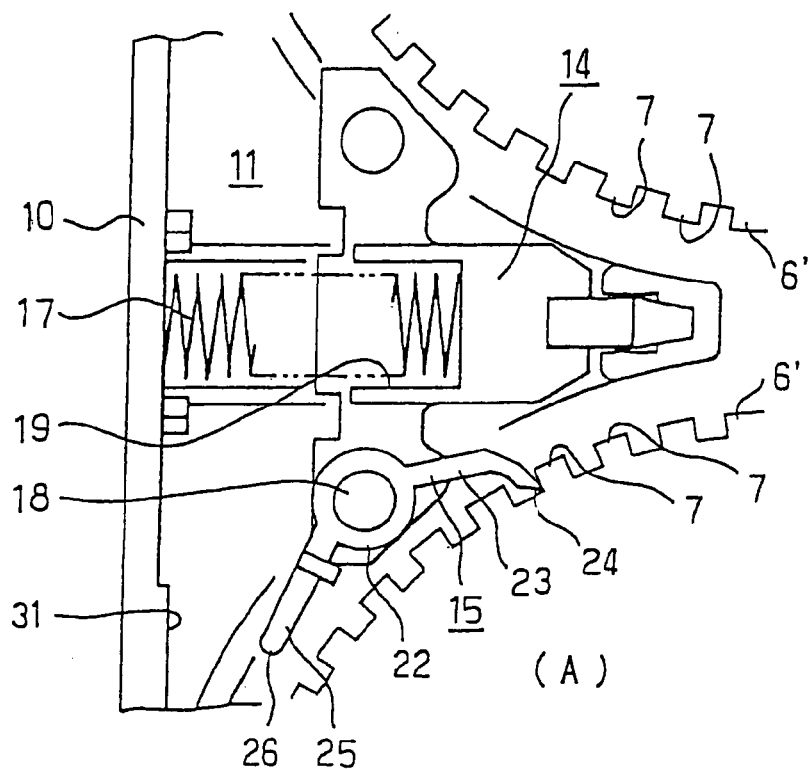
FIGS. 6(A) and 6(B) illustrate, along with FIGS. 7 to 9, the movements of the reel lock mechanism in turn.
Figure 6:
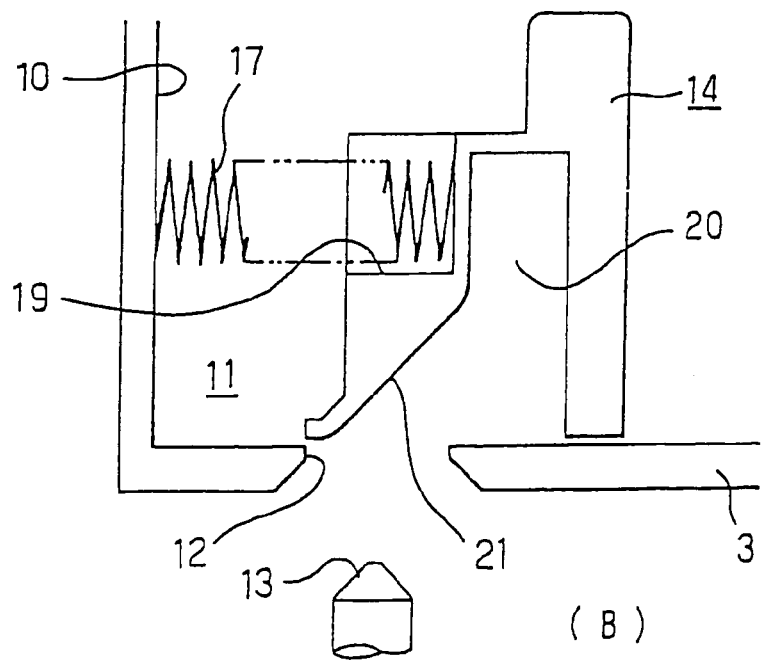

Since the slider 14 is biased forward, a rotational force is applied to the two tape reels 6 and 6 through the respective anchoring pawls 24 and 24 in the direction in which the magnetic tape 5 is tensioned, so that the magnetic tape 5 is maintained in a tensioned state when the tape reels 6 and 6 are locked (see FIG. 6).

Figure 7:
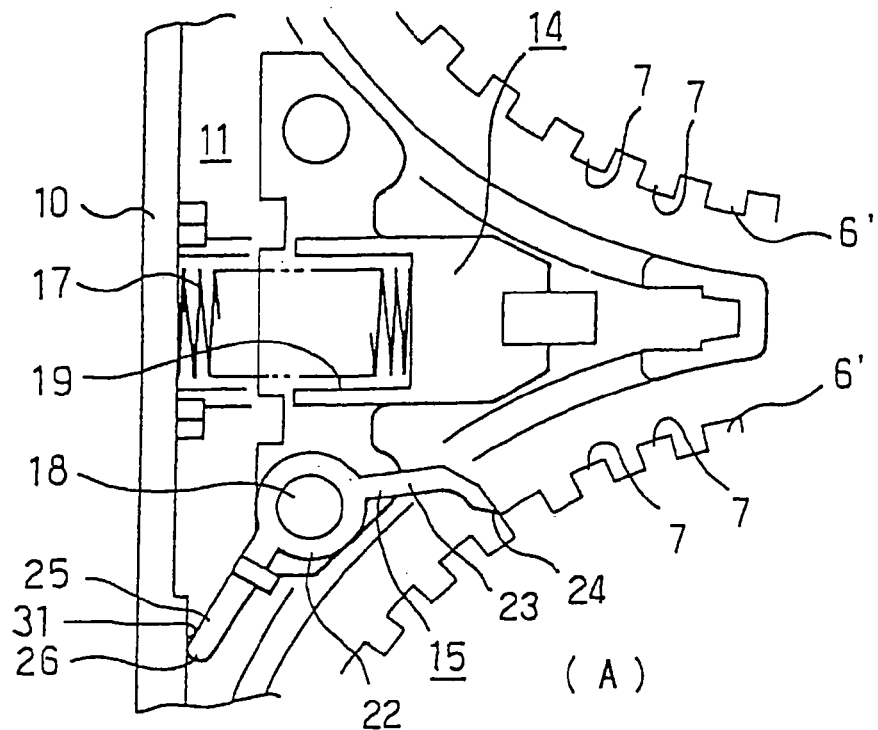
FIGS. 7(A) and 7(B) illustrate a state in which a cam follower is in contact with a cam.
Figure 7:
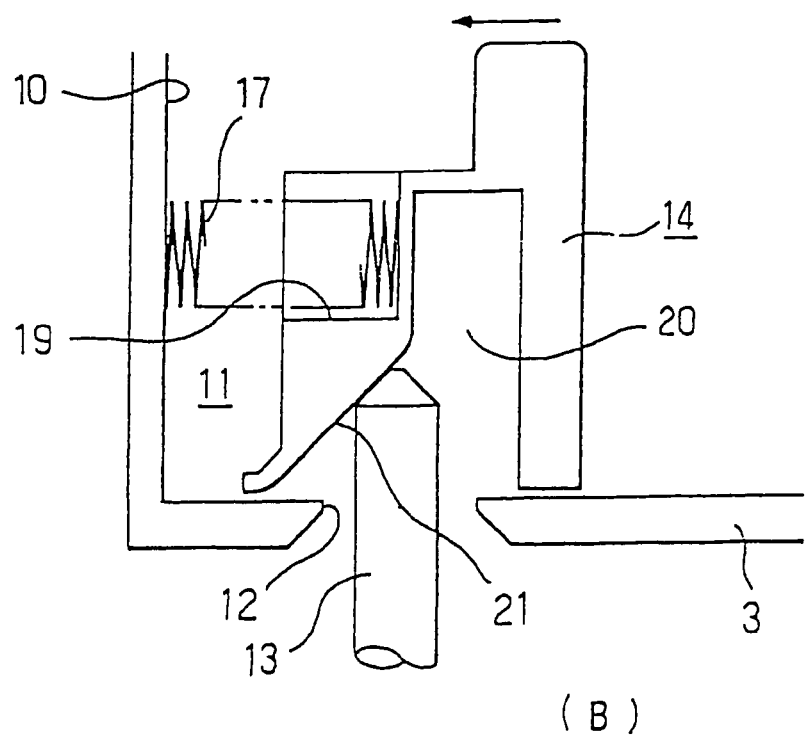

When the tape cassette 1 is loaded into a tape drive device, the insertion pin 13 of the tape drive device is inserted into the cassette shell 4 from the rectangular hole 12 of the cassette shell 4, and comes into contact with the inclined surface 21 defining the pin insertion recess 20 of the slider 14 (see FIG. 7).

Figure 8:
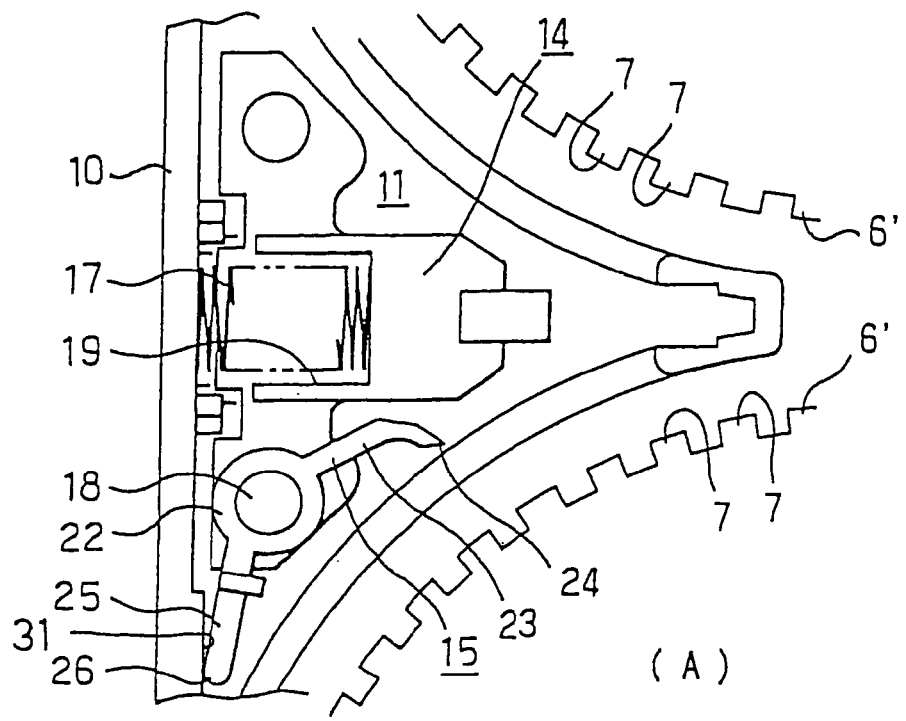
FIGS. 8(A) and 8(B) illustrate a state in which a lock portion is separated from the tape reel.
Figure 8:
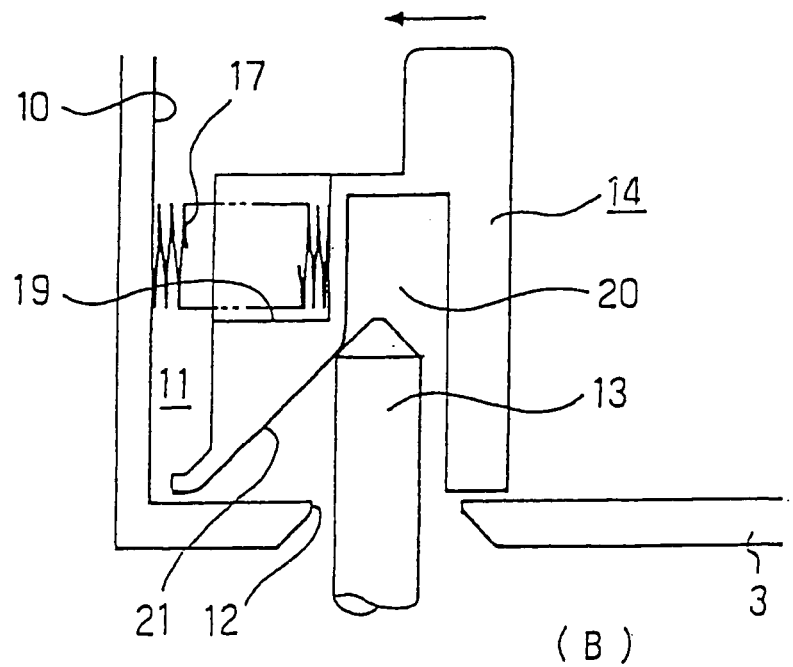

When the insertion pin 13 is further inserted into the pin insertion recess 20 of the slider 14, the front end of the insertion pin 13 pushes the inclined surface 21, so that the slider 14 moves towards the back against the biasing force of the slide spring 17 (see FIG. 8).

When the cam followers 26 and 26 of the respective lock portions 15 and 15 come into contact with the cams 31 and 31 of the back wall 10 of the cassette shell 4 (see FIG. 7), the cam followers 26 and 26 are relatively pushed by the respective cams 31 and 31.

By this, the cam followers 26 and 26 move away from each other while sliding along the respective cams 31 and 31, so that the lock portions 15 and 15 rotate.

Figure 9:
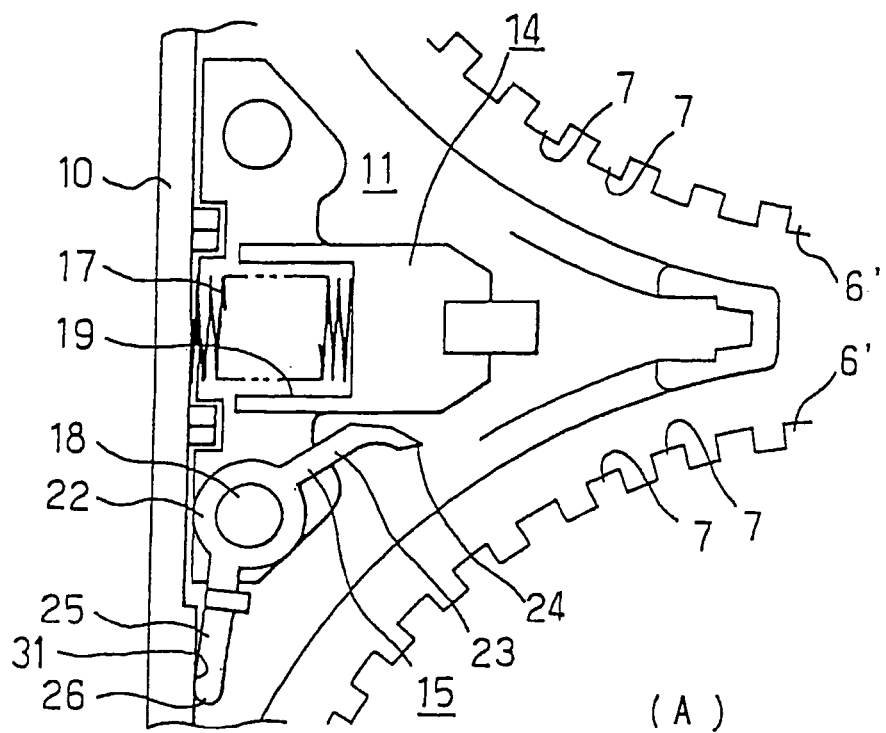
FIGS. 9(A) and 9(B) illustrate a state in which the tape reel is completely unlocked.
Figure 9:
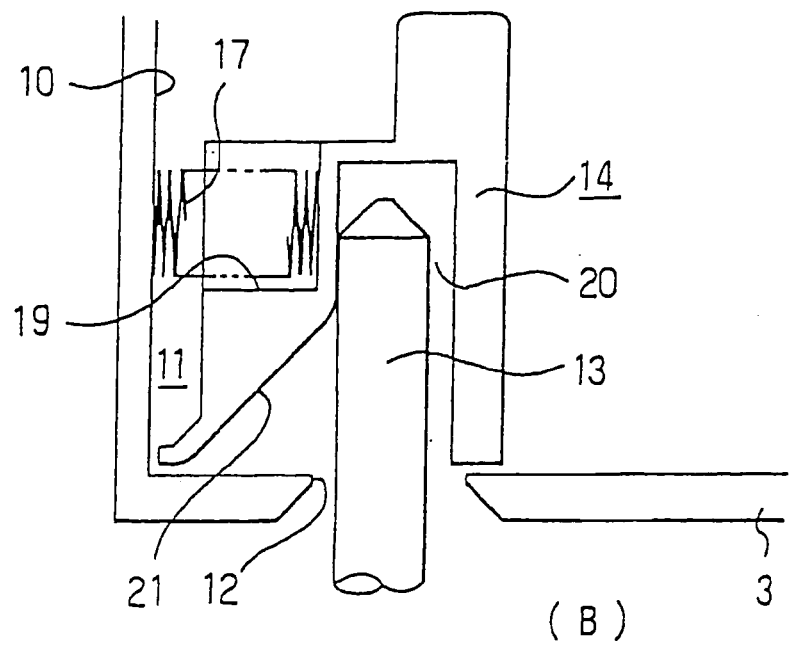

The lock portions 15 and 15 rotate so that the anchoring pawls 24 and 24 at the front ends of the lock portions 15 and 15 move towards each other, and so that the anchoring pawls 24 and 24 move away from the respective tape reels 6 and 6, causing the tape reels 6 and 6 to be unlocked and to become rotatable (see FIG. 9).

Figure 10:
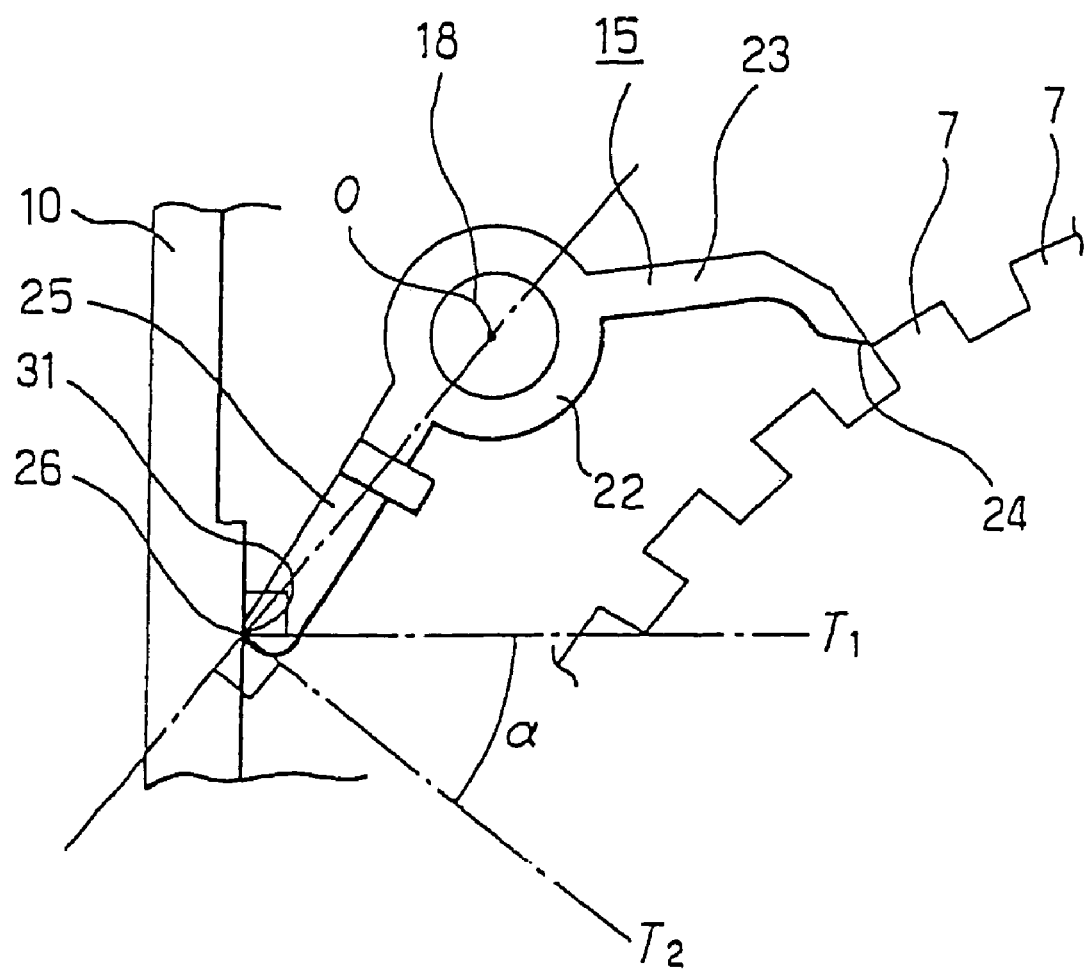
FIG. 10 is a schematic plan view for illustrating a pressure angle.

FIG. 10 is an enlarged view showing a state in which a cam follower 26 is in contact with a cam 31. It can be seen that, when an angle formed by a normal line T1 to the cam 31 and a movement direction T2 of the cam follower 26 (direction of a tangential line to the cam follower 26 with respect to rotational center O), that is, a pressure angle is α, the pressure angle α is small, so that the slider 14 moves smoothly, that is, the sliding resistance between the cam follower 26 and the cam 31, or the resistance to the movement of the slider 14, is small.

The back portions 25 of the respective lock portions 15 extend in a wider portion of the triangular space 11 situated towards the back wall 10, so that it is possible to relatively easily design the reel lock mechanism in terms of orientations of the back portions 25 of the lock portions 15 from the support portions 22. Therefore, it is possible to further reduce the pressure angle.

The cams 31 and 31 may be formed as inclined surfaces that are displaced backward as they extend outward, that is, as they extend towards the left and right from the center, so that the pressure angles between the cam followers 26 and 26 and the respective cams 31 and 31 can be further reduced.

In this way, providing the cams 31 and the cam followers 26 in the back-wall-10-side portion of the triangular space increases the freedom with which the reel lock mechanism is designed in terms of pressure angle, so that the reel lock mechanism 9 can move smoothly.

When the tape cassette 1 is accidentally dropped, the lock portions 15 upon which shock is exerted tend to rotate. Since the front portions 23 and the back portions 25 are formed so that they extend in opposite directions with the respective support portions 22 as rotational centers, rotational forces acting in opposite directions are produced at the front portions 23 and the respective back portions 25, so that the rotational forces acting in both directions cancel each other. Thus, rotational forces are not produced at the lock portions 15 and 15 as a whole. Even if rotational forces are produced, the rotational forces can be made very small, so that the tape reels 6 and 6 do not become unlocked.

Therefore, even if the tape cassette 1 is dropped, the lock portions 15 and 15 do not rotate due to, for example, dropping shock. Consequently, it is possible to reduce the elastic force of the lock spring 16. By setting the elastic force of the lock spring 16 to a small value, the contact pressures between the cams 31 and the respective cam followers 26 can be made small, thereby making it is possible to reduce the wear on both contact surfaces of the cams 31 and the respective cam followers 26, as a result of which the reel lock mechanism 9 can be smoothly moved for a long period of time. In addition, it is not necessary to use a special material for the contact surfaces, so that costs are not increased.

Next, a reel lock mechanism of a tape cassette and a tape cassette using the reel lock mechanism of a second embodiment of the present invention will be described with reference to FIGS. 11 to 22.

A tape cassette 101 comprises a cassette shell 104 formed by a top shell 102 and a bottom shell 103. Two tape reels 106 and 106 upon which a magnetic tape 105 is wound are rotatably accommodated inside the cassette shell 104. A plurality of engaging teeth 107, 107, . . . , are formed at the peripheral edges of lower flanges 106' and 106' of the respective tape reels 106 and 106 (see FIGS. 11 to 13).

The engaging teeth 107, 107, . . . , are formed by recesses and protrusions that are alternately formed at the peripheral edge of each tape reel 106.

The shapes of the engaging teeth 107, 107, . . . , will be specifically described. Bottom surfaces 109 defining recesses 108 have central portions protruding into chevron shapes. Both corners of each protrusion 110 have inclined surfaces (hereinafter referred to as "the tapered surfaces") 110' and 110'. As described later, the recesses 108 and the protrusions 110 forming the engaging teeth 107 are formed symmetrically in radial directions extending through their respective centers. The two tape reels 106 and 106 (supply reel and take-up reel) have the same shapes (see FIGS. 18 to 22).

One tapered surface 110', which is disposed at a side that contacts an inclined surface 109", of a protrusion 110 (marked with a dot in the relevant figures) adjacent to one inclined surface 109' of a chevron-shaped bottom surface 109, defining a recess 108, through the other inclined surface 109", and the one inclined surface 109' are formed so as to be positioned in substantially the same plane. As mentioned above, the recess 108 and the protrusion 110 are both formed symmetrically in radial directions. Therefore, the one inclined surface 109' and the other inclined surface 109" defining the recess 108 are formed with the same angles of inclination in the radial directions. Further, the one tapered surface 110' and the other tapered surface 110" of the protrusion 110 are formed with the same angles of inclination in the radial directions (see FIGS. 18 to 22).

The widths of the recesses 108 and the protrusions 110 in the circumferential direction do not need to be the same.

Figure 11:
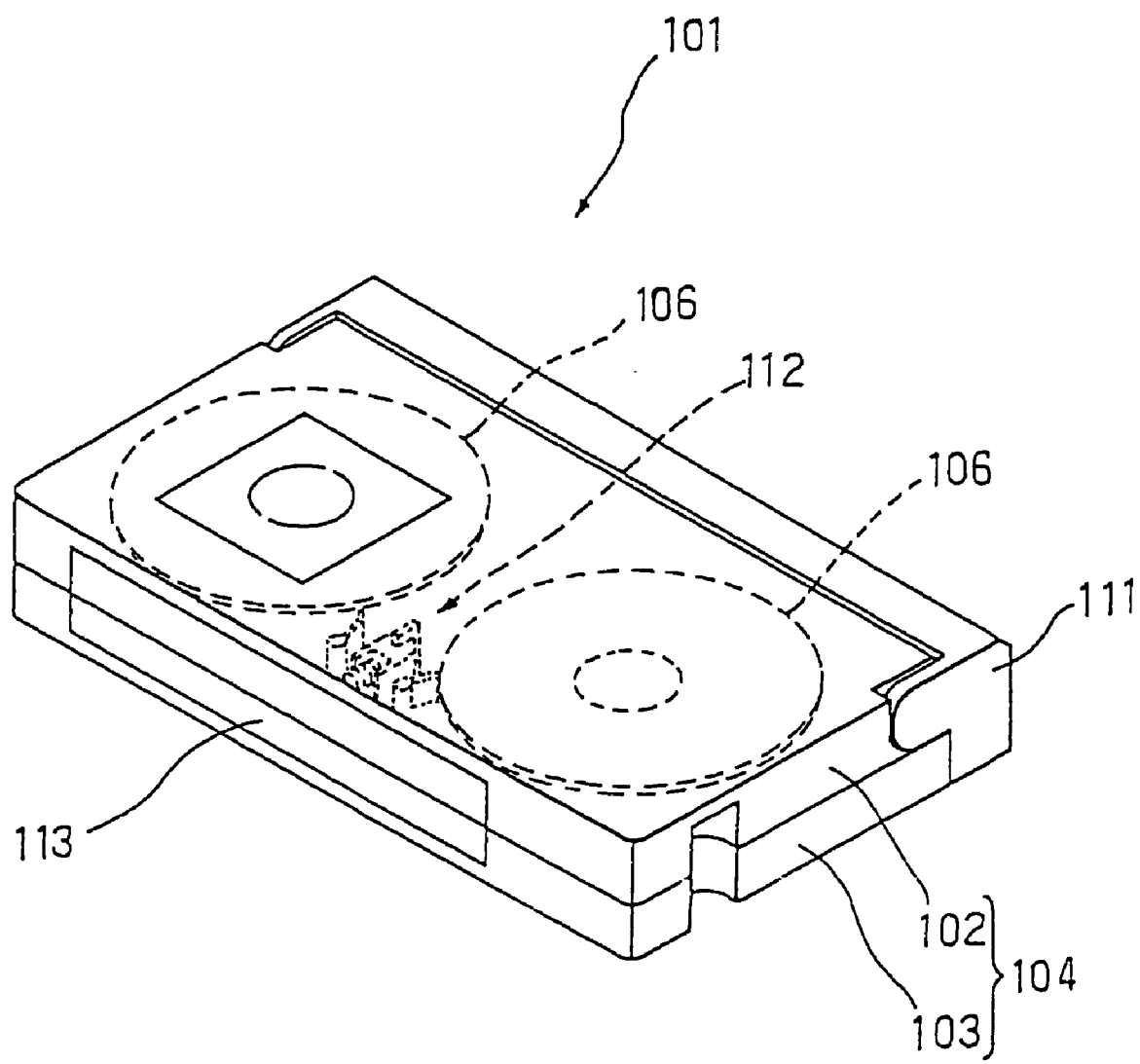
FIG. 11 illustrates, along with FIGS. 12 to 22, a tape cassette and a reel lock mechanism of the tape cassette of a second embodiment of the present invention, and is a schematic perspective view of the tape cassette from the front side thereof.
Figure 12:
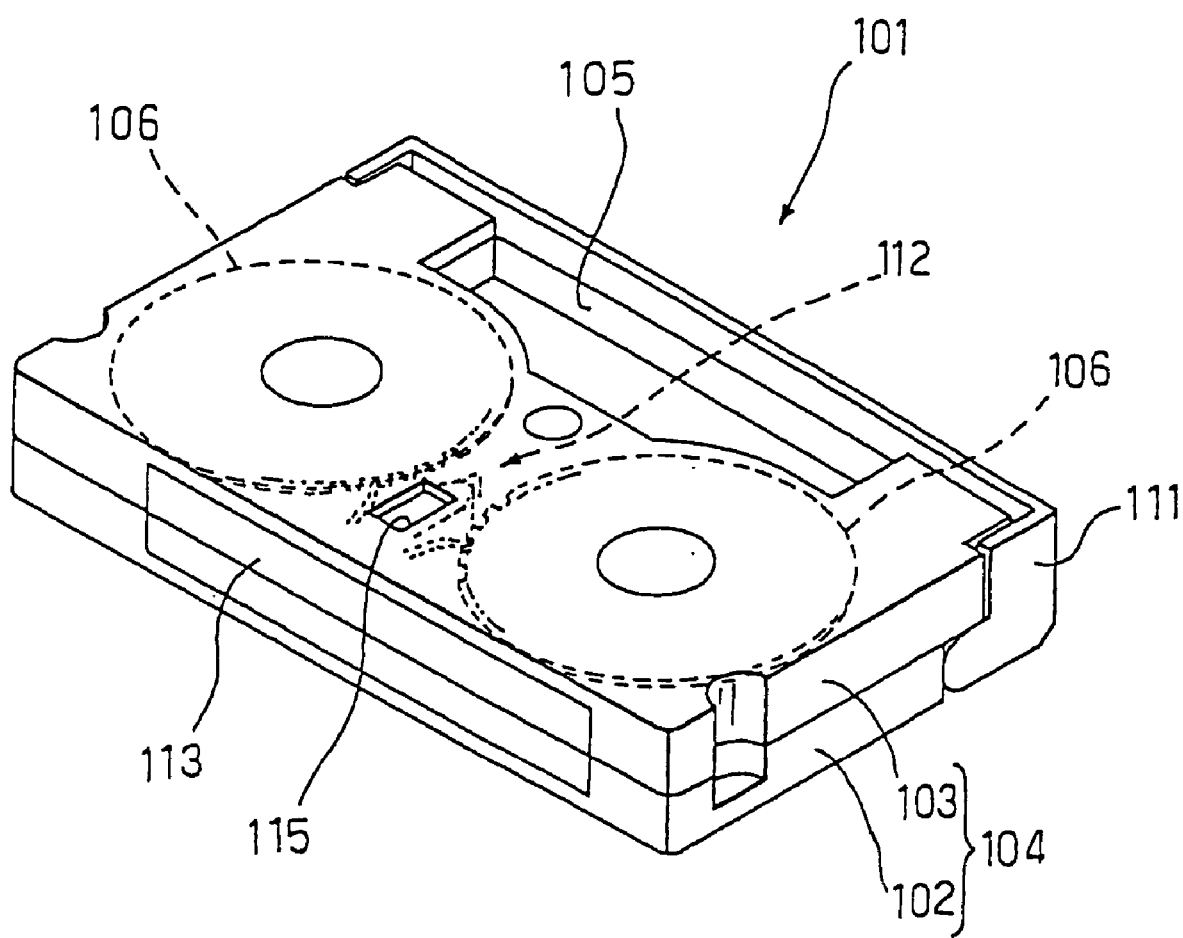
FIG. 12 is a schematic perspective view of the tape cassette from the back side thereof.
Figure 13:
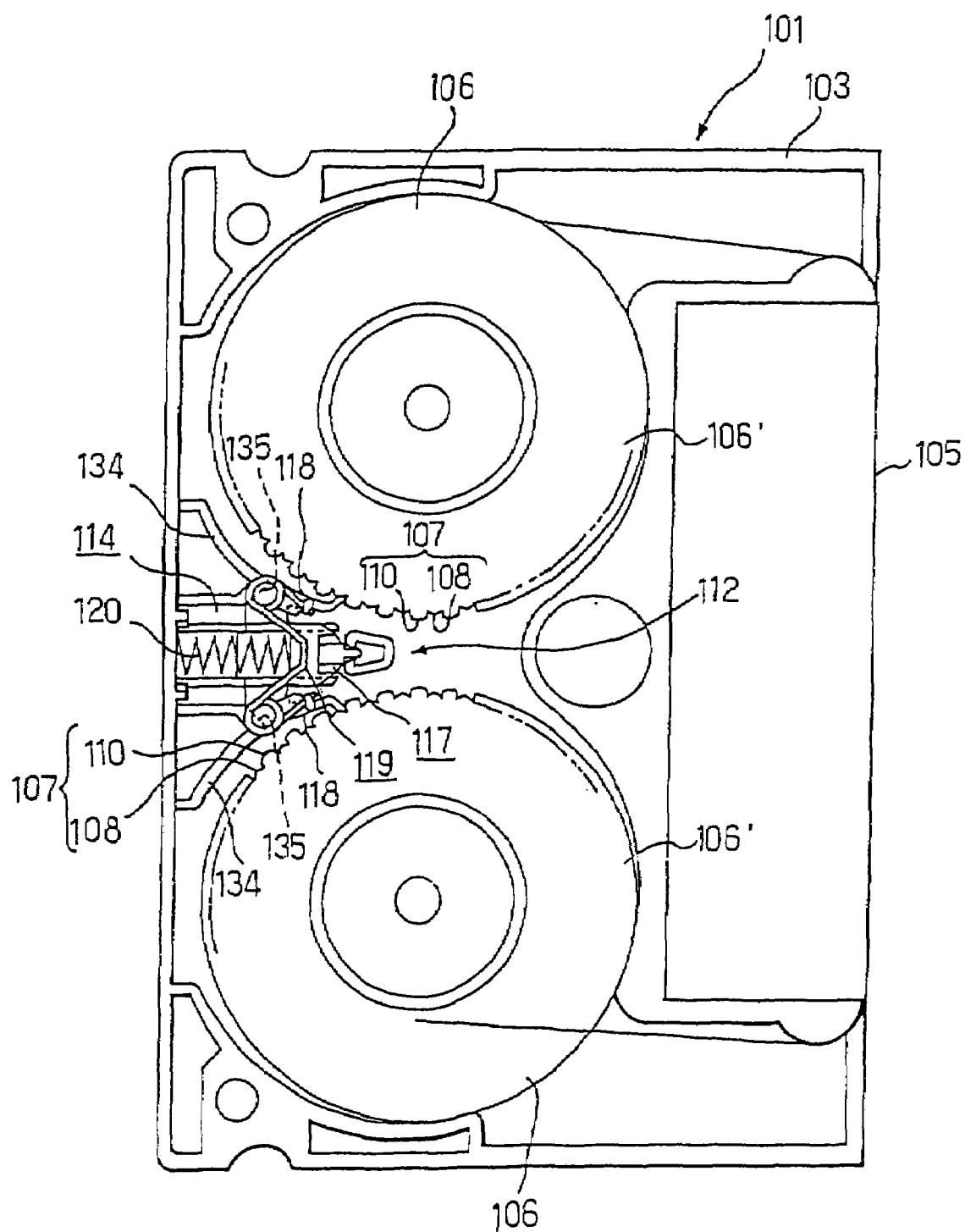
FIG. 13 is a schematic plan view showing a state in which a top shell of the tape cassette is removed.

A front lid 111 for covering the front surface of the magnetic tape 105 positioned along the front surface of the cassette shell 104 is rotatably supported at the front end of the cassette shell 104 (see FIGS. 11 and 12).

A reel lock mechanism 112 is provided in a substantially triangular space (hereinafter referred to as "the triangular space"), defined by a back wall 113 and the two tape reels 106 and 106, inside the cassette shell 104. A rectangular hole 115 is formed in a portion of the bottom surface of the bottom shell 103 where the reel lock mechanism 112 is situated. When the tape cassette 101 is loaded into a tape drive device, an insertion pin 116, provided at the tape drive device, is inserted into the cassette shell 104 from the rectangular hole 115 (see FIGS. 16 and 17), and acts on the reel lock mechanism 112 in order to unlock the tape reels 106 and 106 (see FIGS. 18 to 22).

Figure 14:
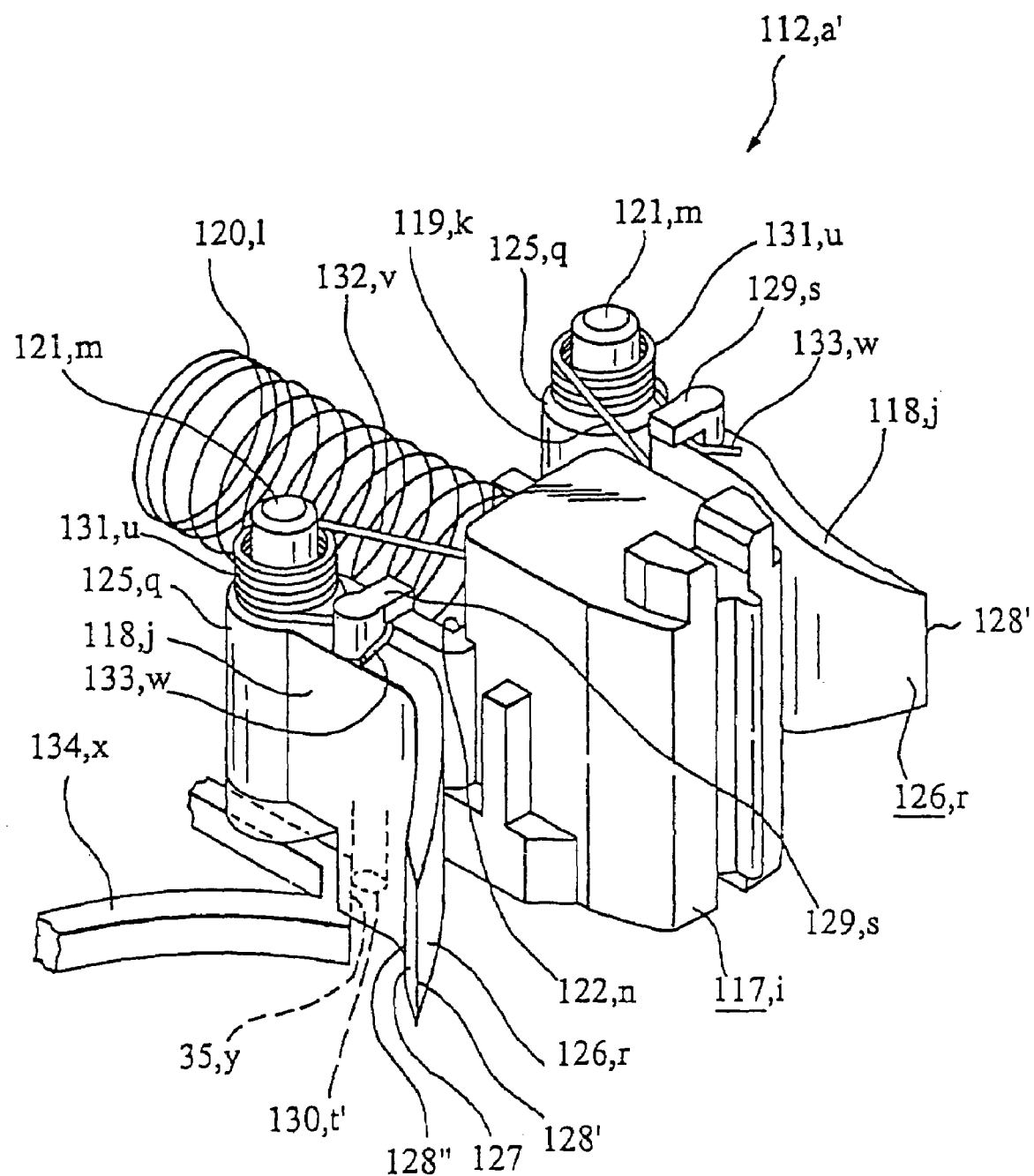
FIG. 14 is an enlarged perspective view of the reel lock mechanism.
Figure 15:
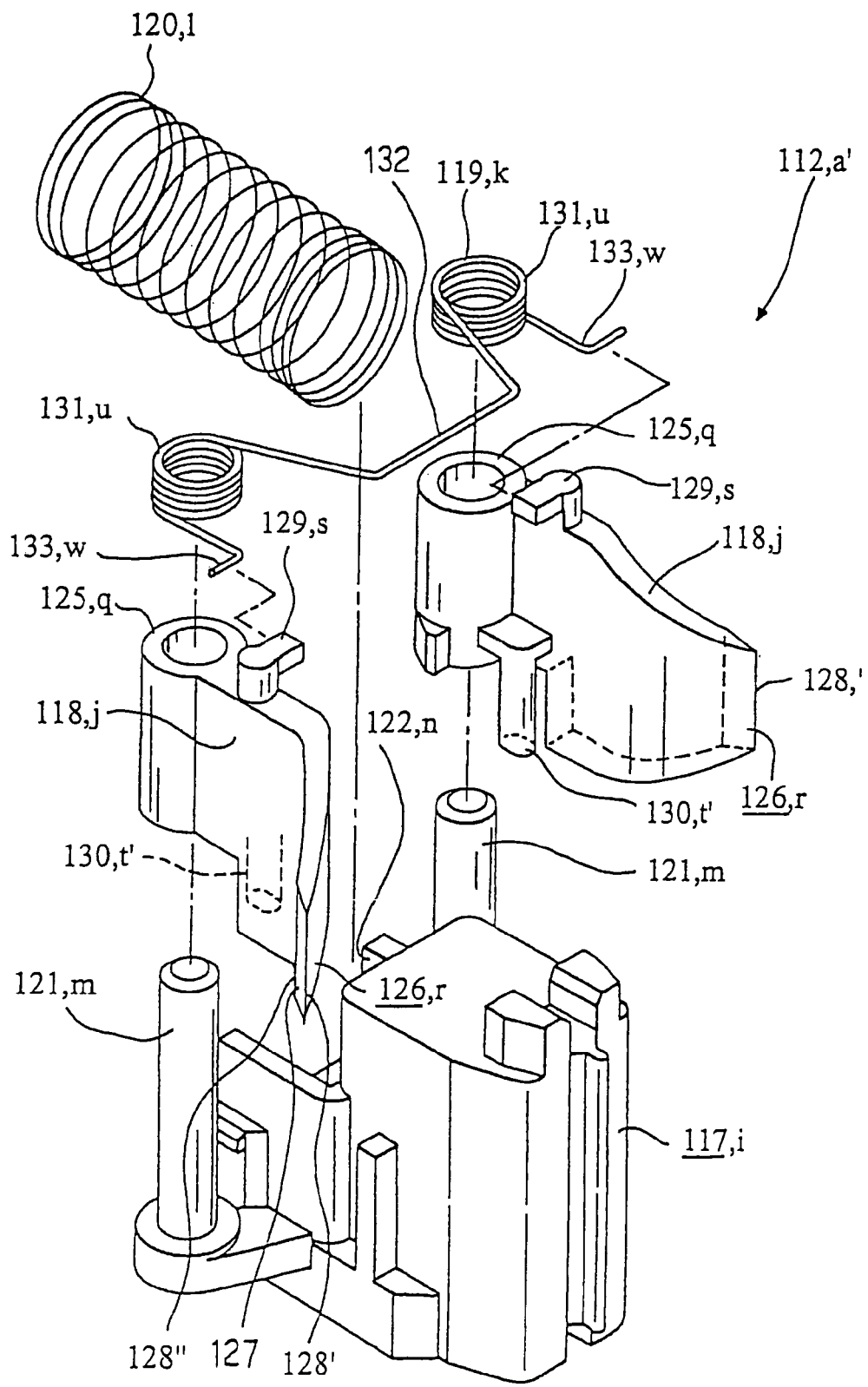
FIG. 15 is an enlarged exploded perspective view of the reel lock mechanism.

The reel lock mechanism 112 comprises a slider 117, two lock portions 118 and 118, a lock spring 119, and a slide spring 120 (see FIGS. 14 and 15).

The slider 117 is disposed so as to be movable forward and backward at the bottom shell 103. Upwardly protruding support shafts 121 and 121, which are separated in the leftward and rightward directions, are provided at the back end of the slider 117. A placement recess 122, which opens upward and backward, is formed between the support shafts 121 and 121 of the slider 117 (see FIGS. 13 to 15).

Figure 16:
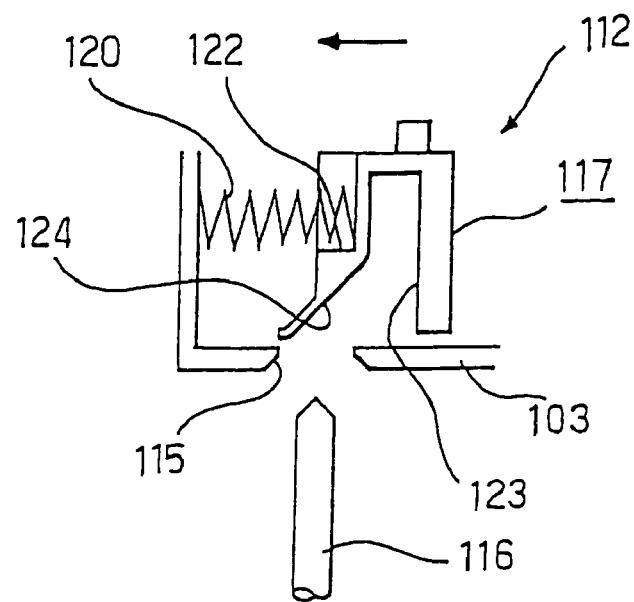
FIG. 16 is, along with FIG. 17, a schematic vertical sectional view showing in enlarged form the reel lock mechanism, and shows a locked state.
Figure 17:
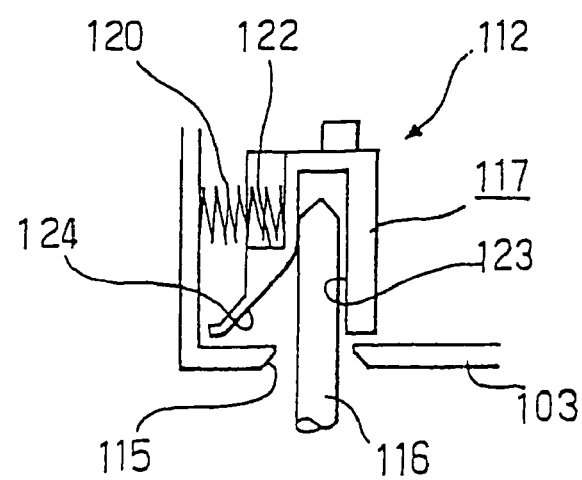
FIG. 17 shows an unlocked state.

A pin insertion recess 123, which opens at the bottom side thereof, for inserting the insertion pin 116 of the tape drive device is formed in a portion of the slider 117 situated forwardly of the placement recess 122, and the lower half of the back surface defining the pin insertion recess 123 is an inclined surface 124 which is displaced backward as it extends downward (see FIGS. 16 to 17).

The two lock portions 118 and 118 are formed symmetrically, each being one plate-shaped member having a substantially chevron shape as a whole in plan view. Vertically extending cylindrical support portions 125 and 125 are formed integrally with the back ends of the respective plate-shaped members. The front end portions of the two lock portions 118 and 118 extend away from each other. Tapered anchoring pawls 126 and 126 are formed at the front ends of the respective lock portions 118 and 118 (see FIGS. 14 and 15 and FIGS. 18 to 22).

A surface 127 of each anchoring pawl 126 facing its corresponding tape reel 106 is a flat surface. The width of each flat surface 127 in the forward-and-backward directions is larger than the distance between one inclined surface 109' of each recess 108 between adjacent engaging teeth 107 formed so as to be positioned in substantially the same plane and one tapered surface of each protrusion 110 adjacent the inclined surface 109' through the other inclined surface 109".

Spring catch portions 129 are integrally formed with the top side edges of the respective lock portions 118 between the support portions 125 and the respective anchoring pawls 126. Lower side edges of the respective lock portions 118 have forms in which the front side portions thereof protrude downward from substantially the longitudinal centers of the lower side edges of the respective lock portions 118. The back edges of the respective downwardly protruding portions are cam followers 130 which come into contact with respective cams (described later) for rotating the respective lock portions 118 (see FIGS. 14 and 15 and FIGS. 18 to 22). Externally fitting the support portions 125 and 125 to their respective support shafts 121 and 121 of the slider 117 rotatably supports the lock portions 118 and 118 at the slider 117 (see FIGS. 14 and 15).

The lock spring 119 is a torsion coil spring, in which coil portions 131 and 131, a linking portion 132 linking the coil portions 131 and 131, and engaging portions 133 and 133 are integrally formed, with the coil portions 131 and 131 being separated in the leftward and rightward directions and the engaging portions 133 and 133 protruding from their respective coil portions 131 and 131 and being positioned outwardly of the linking portion 132. The two coil portions 131 and 131 are supported at their respective support shafts 121 and 121 by being externally fitted to the top sides of the support portions 125 and 125 of their respective lock portions 118 and 118. The two engaging portions 133 and 133 engage the spring catch portions 129 and 129 of the two lock portions 118 and 118, so that the two lock portions 118 and 118 are biased in the directions in which the anchoring pawls 126 and 126 move away from each other, that is, in the directions in which the anchoring pawls 126 and 126 engage an engaging tooth 107 and an engaging tooth 107 of the respective tape reels 106 and 106 (see FIG. 14).

The slide spring 120 is a helical compression spring, and is provided in a compressed manner between the inside surface of the back wall 113 of the cassette shell 104 and the placement recess 122 of the slider 117. By this, the slider 117 is biased forward (see FIGS. 16 and 17, and FIGS. 18 to 22).

Ribs 134 and 134 having small heights measured from the bottom surface are provided in a standing manner on both the left and right sides of the slider 117 inside the cassette shell 104. In plan view, the ribs 134 and 134 comprise portions extending in the direction in which the slider 117 slides, portions which move along an arc one size larger than the outer peripheral edges of the respective tape reels 106 and 106, and portions which are located in the paths of movement of the respective lock portions 118 and 118. Of these portions, the portions located in the paths of movement of the respective lock portions 118 and 118, more specifically, the portions situated in correspondence with the respective cam followers 130 and 130 are cams 135 and 135 for controlling rotation of the respective lock portions 118 and 118 (see FIGS. 14 and 15).

Figure 18:
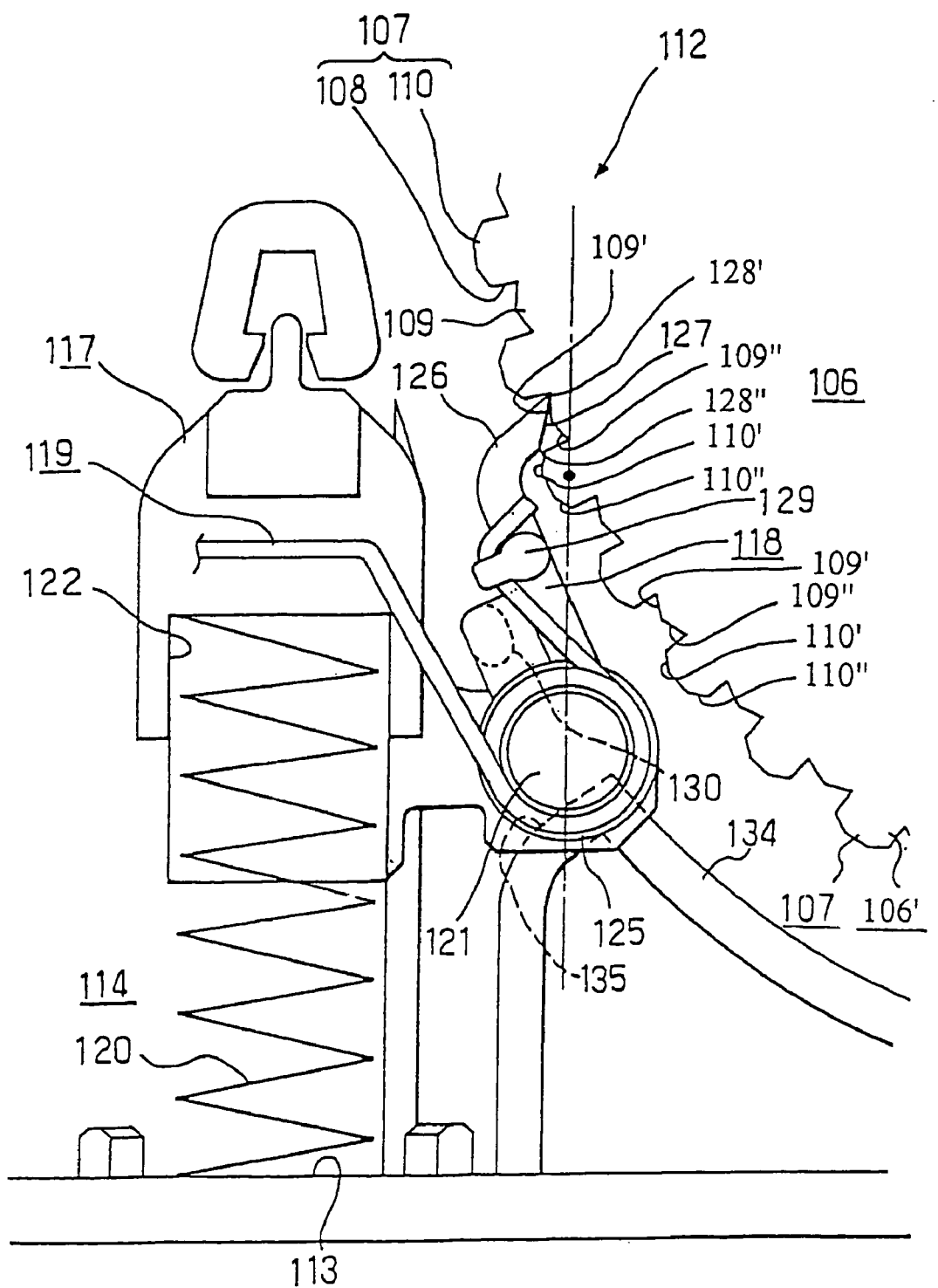
FIG. 18 is, along with FIGS. 19 to 22, an enlarged plan view showing the movements of the reel lock mechanism in turn, and shows a locked state.
Figure 22:
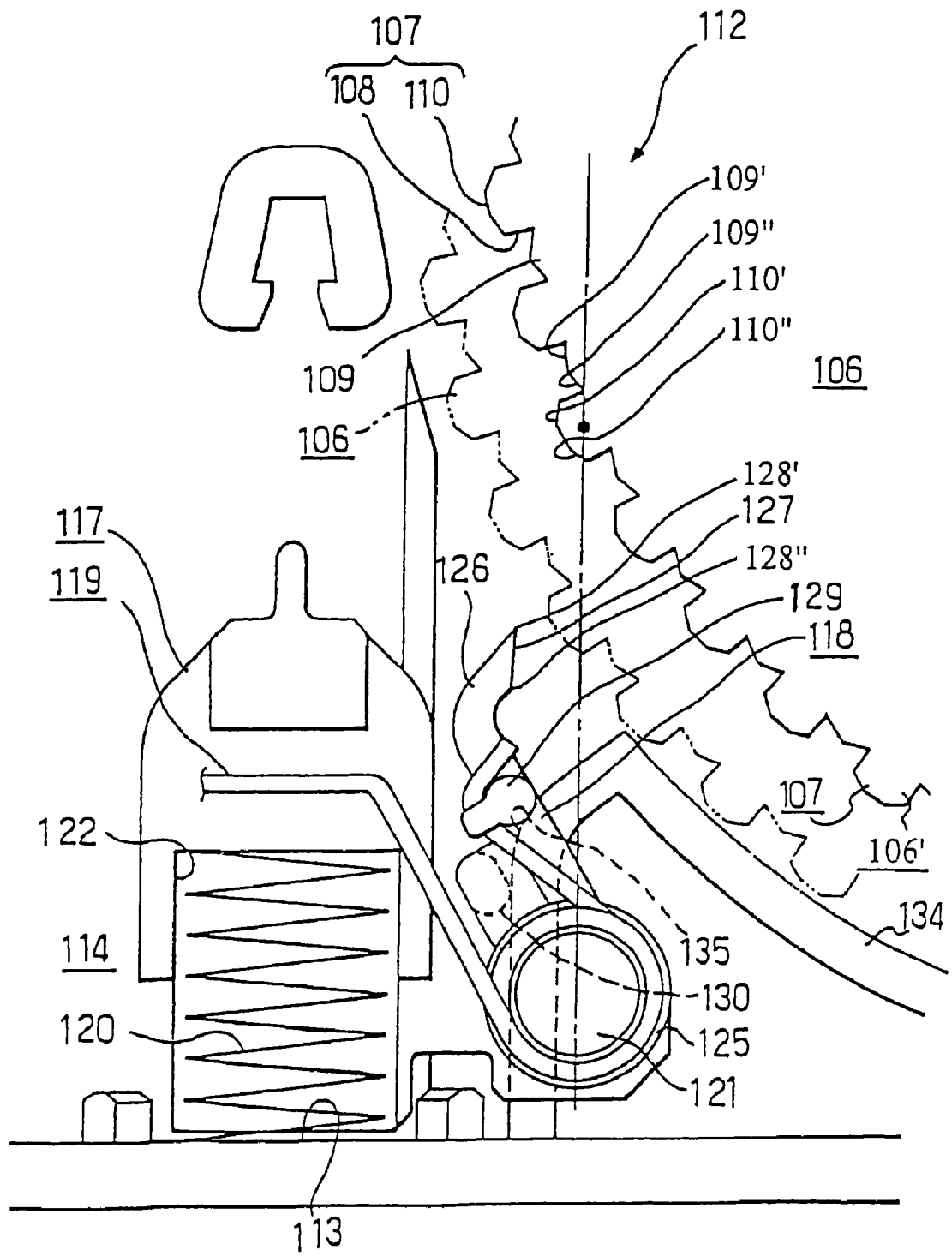
FIG. 22 shows a state in which a tape reel is completely unlocked as a result of withdrawal of the lock portion from the position shown in FIG. 21.

Next, a description of the movement of the reel lock mechanism 112 will be given. FIGS. 16 and 17 are enlarged sectional views of the main portion of the reel lock mechanism 112, and FIGS. 18 to 22 are enlarged plan views of the main portion of the reel lock mechanism 112. FIGS. 16 and 18 show a state in which a tape reel lock 106 is locked. FIGS. 17 and 22 show a state in which the tape reel 106 is completely unlocked. Hereunder, a description of changes in states of the tape reels from the locked state to the unlocked state will be given with reference to FIGS. 18 to 22.

FIGS. 16 and 18 show a state in which the tape reels 106 and 106 are locked by the reel lock mechanism 112 when the tape cassette 101 is not loaded in a tape drive device.

In the state shown in FIGS. 16 and 18, the slider 117 is positioned at the front end of its range of movement by being biased by the slide spring 120, and the lock portions 118 and 118 are rotated in the directions in which the anchoring pawls 126 and 126 move away from each other and are positioned inside recesses 108 and 108 between adjacent engaging teeth 107 and 107 of the respective tape reels 106 and 106, so that the tape reels 106 and 106 are in a locked state (see. FIG. 18).

The lock portions 118 and 118 include anti-rotation means, and are such that they do not rotate beyond a predetermined angle in the directions in which they engage the engaging teeth 107 and 107 of the tape reels 106 and 106. More specifically, when the slider 117 is situated slightly behind the foremost end of its movement range, the lock portions 118 and 118 are rotated to angles of the order in which the front ends of the anchoring pawls 126 and 126 of the respective lock portions 118 and 118 contact the outer peripheral edges of lower flanges 106' and 106' of the respective tape reels 106 and 106, and the flat surfaces 127 and 127 of the respective anchoring pawls 126 and 126 face substantially the same directions in the forward-and-backward directions. In the state shown in FIGS. 18 to 20, the rotation of the anchoring pawls 126 and 126 is restricted by the anti-rotation means, so that the anchoring pawls 126 and 126 do not move towards the respective tape reels 106 and 106.

Since the slider 117 is biased forward, a rotational force is applied to the two tape reels 106 and 106 through the respective anchoring pawls 126 and 126 in the direction in which the magnetic tape 105 is tensioned, so that the magnetic tape 105 is maintained in a tensioned state when the tape reels 106 and 106 are locked (see FIG. 18).

As can be seen in FIG. 18, a front end 128' of the flat surface 127 of the anchoring pawl 126 of each lock portion 118 is positioned at one corner of the bottom surface of a recess 108 between adjacent engaging teeth 107 of each tape reel 106, and the flat surface 127 of each anchoring pawl 126 is substantially in contact with one inclined surface 109' defining the recess 108.

When the tape cassette 101 is loaded into a tape drive device, the insertion pin 116 of the tape drive device is inserted into the cassette shell 104 from the rectangular hole 115 of the cassette shell 104, and comes into contact with the inclined surface 124 defining the pin insertion recess 123 of the slider 117.

Figure 19:
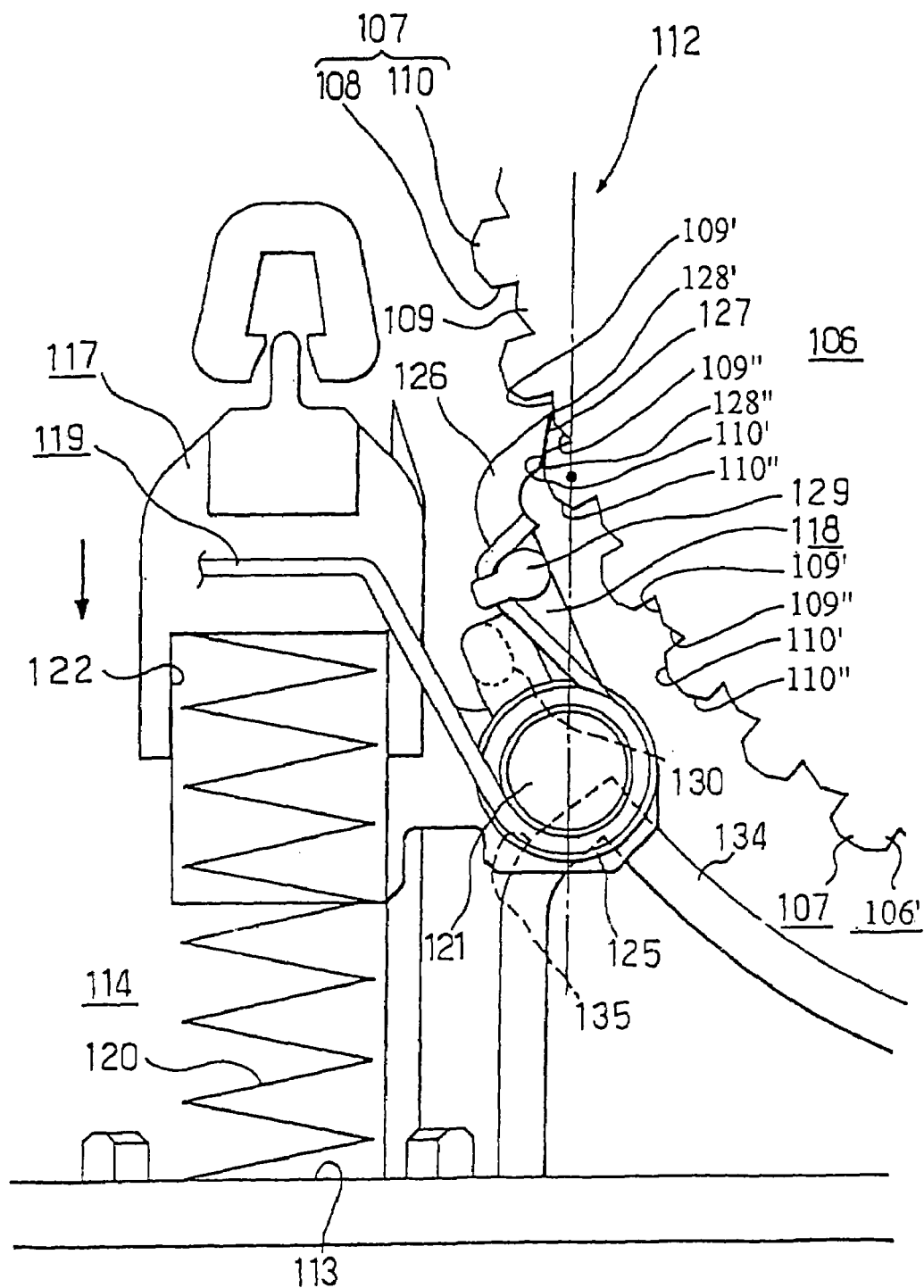
FIG. 19 shows a state in which a flat surface of an anchoring pawl is in contact with one inclined surface defining a recess between engaging teeth and one tapered surface of a protrusion as a result of slight withdrawal of a lock portion from the position shown in FIG. 18.

When the insertion pin 116 is further inserted into the pin insertion recess 123 of the slider 117, the front end of the insertion pin 116 pushes the inclined surface 124, so that the slider 117 moves towards the back against the biasing force of the slide spring 120 (see FIG. 19).

When the slider 117 starts to withdraw, the front end 128' of the flat surface 127 of each anchoring pawl 126 separates from the aforementioned one corner. Each flat surface 127 slides along the one inclined surface 109' of the recess 108, so that a back end 128" thereof comes into contact with one tapered surface 110' of a protrusion 110. This is because, as described above, one inclined surface 109' of a recess 108 and one tapered surface 110' of a protrusion 110 adjacent to the one inclined surface 109' through the other inclined surface 109" are formed so as to be positioned in substantially the same plane (see FIG. 19).

Figure 20:
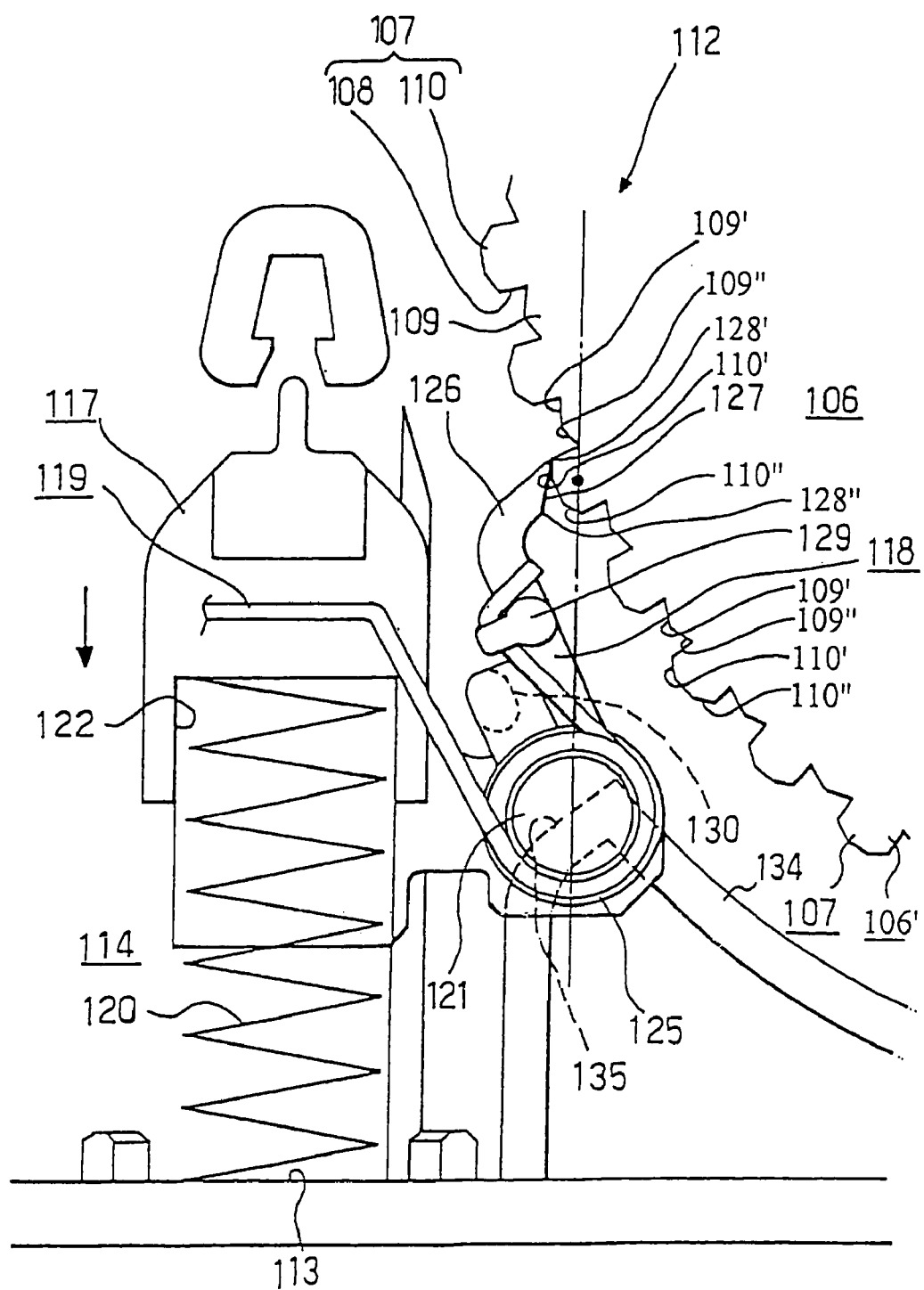
FIG. 20 shows a state in which the flat surface of the anchoring pawl is in contact with only the one tapered surface of the protrusion of the engaging tooth as a result of slight withdrawal of the lock portion from the position shown in FIG. 19.
Figure 21:
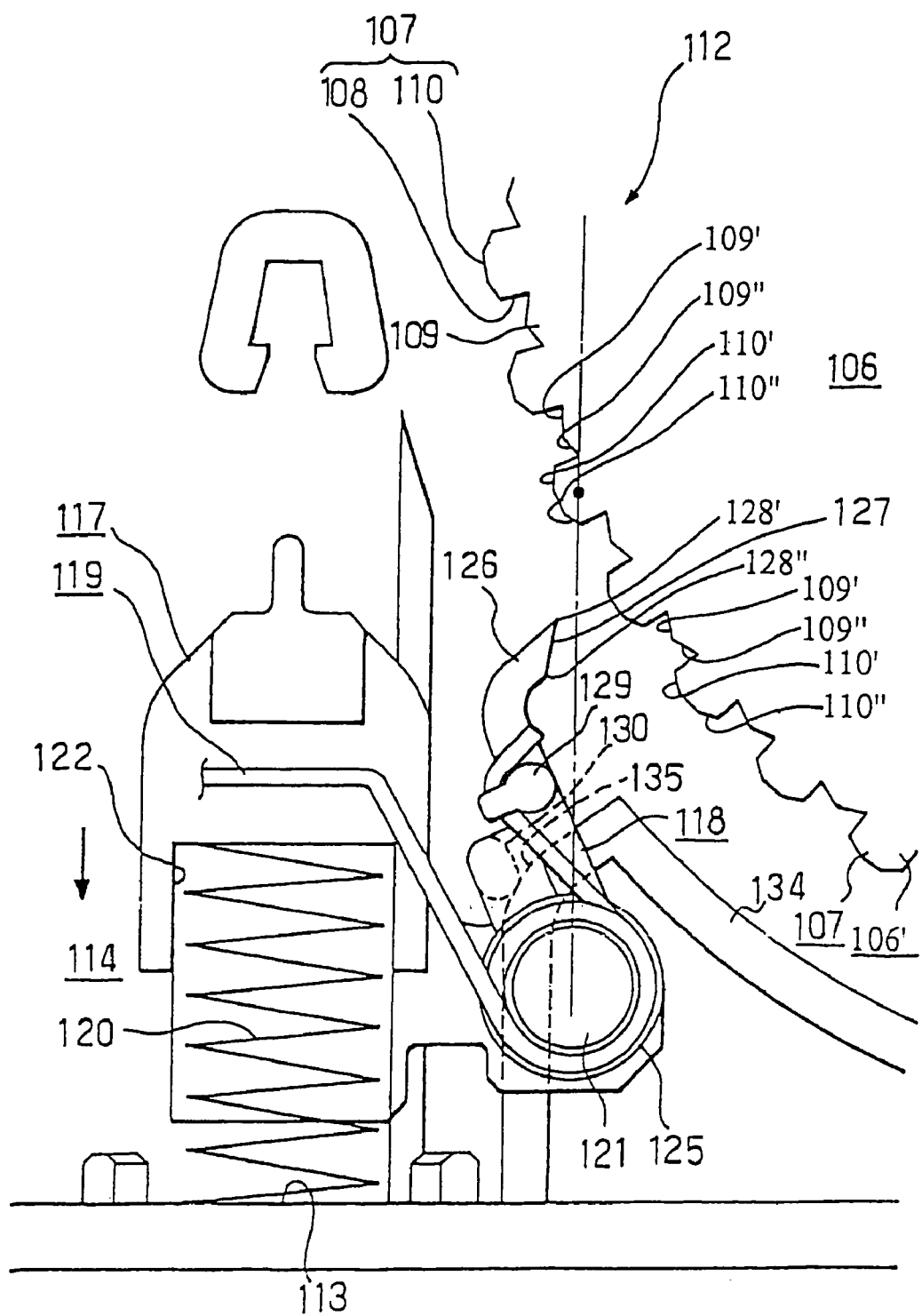
FIG. 21 shows a state in which a cam follower is in contact with a cam as a result of withdrawal of the lock portion from the position shown in FIG. 20.

When the slider 117 withdraws further, the flat surface 127 of each anchoring pawl 126 moves away from the one inclined surface 109' of the recess 108, and is only in contact with the one tapered surface 110' of the protrusion 110 (see FIG. 20).

In this way, when the lock portions 118 move backward, the anchoring pawls 126 are not caught by any of the protrusions 110 of the engaging teeth 107 of the respective tape reels 106. This is because, as mentioned above, the widths of the flat surfaces 127 of the respective anchoring pawls 126 in the forward-and-backward directions are larger than the distance between the one inclined surfaces 109' of the recesses 108 of the respective anchoring teeth 107 and the tapered surfaces 110' of the protrusions 110 adjacent the inclined surfaces 109' through the other inclined surfaces 109", and the inclined surfaces 109' and the respective tapered surfaces 110' are positioned in substantially the same plane.

As mentioned above, the lock portions 118 do not rotate the respective tape reels 106 by catching them when they move backward as the slider 117 withdraws (see FIG. 20), so that the magnetic tape 105 does not become slack. In FIGS. 18 to 22, it can be seen that the protrusion 110 marked with a dot is not moving.

When the slider 117 withdraws further, the cam followers 130 and 130 come into contact with their respective cams 135 and 135 (see FIG. 21), so that the lock portions 118 and 118 rotate in an unlocking direction, thereby causing the anchoring pawls 126 and 126 to separate from their respective tape reels 106 and 106.

When the slider 117 is in a maximally withdrawn state, the anchoring pawls 126 and 126 of the respective lock portions 118 and 118 are positioned farthest from the tape reels 106 and 106, so that the tape reels 106 and 106 are unlocked, thereby allowing the tape reels 106 and 106 to rotate inside the cassette shell 104.

The tape reels 106 and 106 are accommodated inside the cassette shell 104 so as to be movable slightly towards the front and back and towards the left and right. FIG. 22 shows a state in which one of the table reels 106 shown by alternate long and two short dashed lines is closest to the reel lock mechanism 112. In this state, the lock portions 118 and 118 are rotated to positions where they do not interrupt the rotation of the respective tape reels 106.

In order to prevent reverse rotation of the tape reels 106 and 106 when the tape reels 106 and 106 are being unlocked, the engaging teeth of the tape reels may be formed with sawteeth shapes. However, when they are formed with such shapes, the two tape reels (supply reel and take-up reel) become symmetrical in form, so that the tape reels cannot be formed with the same shape.

In contrast, in the above-described tape cassette 101, the recesses 108 and the protrusions 110 forming the engaging teeth 107 are formed symmetrically in radial directions extending through the centers of the recesses 108 and the protrusions 110. Therefore, the two tape reels (supply reel and take-up reel) do not particularly need to be formed as special-purpose component parts, and can, thus, be formed as common parts. Consequently, costs are not increased for forming a structure which provides the above-described advantages.

Specific forms and structures of each part in each of the above-described embodiments are merely specific examples in carrying out the present invention, so that the technical scope of the present invention is not to be construed as being restricted by these forms and structures.

As is clear from the foregoing description, the present invention provides a reel lock mechanism of a tape cassette for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Loading of the tape cassette into a tape drive device causes the slider to withdraw and the lock portions to rotate in directions in which the lock portions move away from the respective tape reels in order to unlock the tape reels. Each lock portion has a front portion including an anchoring pawl which engages the tape reel and a back portion extending in a direction substantially opposite to the front portion with a support portion supported by the slider serving as center. When the slider withdraws, the back portion of each lock portion comes into contact with the inside surface of the back wall of the cassette shell and each lock portion rotates in an unlocking direction, so that each anchoring pawl separates from the tape reel.

The present invention provides a tape cassette comprising a reel lock mechanism for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Loading of the tape cassette into a tape drive device causes the slider to withdraw and the lock portions to rotate in directions in which the lock portions move away from the respective tape reels in order to unlock the tape reels. Each lock portion has a front portion including an anchoring pawl which engages the tape reel and a back portion extending in a direction substantially opposite to the front portion with a support portion supported by the slider serving as center. When the slider withdraws, the back portion of each lock portion comes into contact with the inside surface of the back wall of the cassette shell and each lock portion rotates in an unlocking direction, so that each anchoring pawl separates from the tape reel.

Accordingly, in the reel lock mechanism of tape reels and the tape cassette, since the reel lock mechanism is provided in a back-wall-side portion, or wider portion, of the space between the two tape reels and the inside surface of the back wall of the cassette shell, it is possible to relatively easily design the reel lock mechanism in terms of orientations of the back portions of the lock portions from the support portions. By this, it is possible to smoothly move the reel lock mechanism by reducing the contact angles between the back side portions and the back wall, that is, the pressure angles.

Since the lock portions of the reel lock mechanism comprises support portions and front and back portions extending in substantially opposite directions from the support portions, even if a person accidentally drops the tape cassette, rotational forces acting in opposite directions are produced at the front and back portions, so that the rotational forces acting in both directions cancel each other. Thus, rotational forces are not produced at the lock portions as a whole. Even if rotational forces are produced, the rotational forces can be made very small. Therefore, it is possible to reduce the contact pressures between the back portions of the lock portions and the back wall by setting the elastic force of the lock spring to a small value, thereby making it is possible to reduce the wear on both contact surfaces of the back portions of the lock portions and the back wall, as a result of which the reel lock mechanism can be smoothly operated for a long period of time. In addition, it is not necessary to use a special material for the contact surfaces, so that costs are not increased.

The present invention provides another reel lock mechanism of a tape cassette for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Engagement of an engaging pawl of each lock portion with engaging teeth of the tape reel by a forward movement of the slider causes each tape reel to be locked, or, loading of the tape cassette into a tape drive device causes the slider to withdraw and each lock portion to rotate away from the tape reel, so that each tape reel is unlocked. The engaging teeth are formed by recesses and protrusions alternately provided at the peripheral edge of each tape reel, with the bottom surface defining each recess having a central portion which protrudes in a chevron shape or a corner of each protrusion having an inclined surface. An end portion of each anchoring pawl has a flat surface that comes into contact with one inclined surface of the bottom surface defining a recess and an inclined surface of a protrusion disposed adjacent to the one inclined surface of the bottom surface defining the recess through another inclined surface of the bottom surface defining the recess, the inclined surface of the protrusion being situated adjacent the recess.

The present invention provides another tape cassette comprising a reel lock mechanism for locking tape reels of the tape cassette having the tape reels upon which a tape-shaped recording medium is wound rotatably supported inside a cassette shell. The reel lock mechanism comprises a slider which is disposed in a space between the two tape reels and the inside surface of a back wall of the cassette shell, and which is supported so as to be movable forward and backward; two lock portions which are rotatably supported at both the left and right sides of the slider; a slide spring for pushing the slider forward; and a lock spring for biasing the lock portions in directions in which the lock portions engage the respective tape reels. Engagement of an engaging pawl of each lock portion with engaging teeth of the tape reel by a forward movement of the slider causes each tape reel to be locked, or, loading of the tape cassette into a tape drive device causes the slider to withdraw and each lock portion to rotate, so that each tape reel is unlocked. The engaging teeth are formed by recesses and protrusions alternately provided at the peripheral edge of each tape reel, with the bottom surface defining each recess having a central portion which protrudes in a chevron shape or a corner of each protrusion having an inclined surface. An end portion of each anchoring pawl has a flat surface that comes into contact with one inclined surface of the bottom surface defining a recess and an inclined surface of a protrusion disposed adjacent to the one inclined surface of the bottom surface defining the recess through another inclined surface of the bottom surface defining the recess, the inclined surface of the protrusion being situated adjacent the recess.

Accordingly, with regard to the different reel lock mechanism of tape reels and the different tape cassette of the invention, when the slider is moved backward as a result of loading the tape cassette into a tape drive device, the anchoring pawls of the respective lock portions are not caught by the protrusions of the engaging teeth of the tape reels, so that the tape reels are not rotated when the lock portions withdraw, thereby keeping the tape-shaped recording medium in a tensioned state.

Therefore, when the tape cassette is loaded into a tape drive device, it is possible to prevent, for example, improper formation of a tape path or entangling of the tape-shaped recording medium with a member of the tape drive device by a slack in the tape-shaped recording medium.

The invention claimed is:

1. A reel lock mechanism of a tape cassette for locking tape reels of the tape cassette having the tape reels upon which a tape-shaped recording medium is wound rotatably supported inside a cassette shell, the reel lock mechanism comprising:
   a slider which is disposed in a space between the two tape reels and the inside surface of a back wall of the cassette shell, the slider being supported so as to be movable forward and backward;
   two lock portions which are rotatably supported at both the left and right sides of the slider;
   a slide spring for pushing the slider forward; and
   a lock spring for biasing the lock portions in directions in which the lock portions engage the respective tape reels;
   wherein loading of the tape cassette into a tape drive device causes the slider to withdraw and the lock portions to rotate in directions in which the lock portions move away from the respective tape reels in order to unlock the tape reels;

wherein each lock portion has a front portion including an anchoring pawl which engages the tape reel and a back portion extending in a direction substantially opposite to the front portion with a support portion supported by the slider serving as center; and wherein, when the slider withdraws, the slider moves rectilinearly from a first position to an intermediate position and then to a second position, and when the slider is in the intermediate position, the back portion of each lock portion comes into contact with the inside surface of the back wall of the cassette shell, and when the slider moves from the intermediate position to the second position, the back portion of each lock portion slides along the inside surface of the back wall of the cassette shell causing each lock portion to rotate in an unlocking direction, so that each anchoring pawl separates from the tape reel.

2. A tape cassette comprising a reel lock mechanism for locking tape reels of the tape cassette having the tape reels upon which a tape-shaped recording medium is wound rotatably supported inside a cassette shell, wherein the reel lock mechanism comprises:

a slider which is disposed in a space between the two tape reels and the inside surface of a back wall of the cassette shell, the slider being supported so as to be movable forward and backward;

two lock portions which are rotatably supported at both the left and right sides of the slider;

a slide spring for pushing the slider forward; and a lock spring for biasing the lock portions in directions in which the lock portions engage the respective tape reels;

wherein loading of the tape cassette into a tape drive device causes the slider to withdraw and the lock portions to rotate in directions in which the lock portions move away from the respective tape reels in order to unlock the tape reels;

wherein each lock portion has a front portion including an anchoring pawl which engages the tape reel and a back portion extending in a direction substantially opposite to the front portion with a support portion supported by the slider serving as center; and wherein, when the slider withdraws, the slider moves rectilinearly from a first position to an intermediate position and then to a second position, and when the slider is in the intermediate position, the back portion of each lock portion comes into contact with the inside surface of the back wall of the cassette shell, and when the slider moves from the intermediate position to the second position, the back portion of each lock portion slides along the inside surface of the back wall of the cassette shell causing each lock portion to rotate in an unlocking direction, so that each anchoring pawl separates from the tape reel.

3. The reel lock mechanism according to claim 1, wherein left and ride side portions of the inside surface of the back wall of the cassette shell are inclined to serve as cams for guiding the back portion of each lock portion.

4. The reel lock mechanism according to claim 3, wherein the back portion of each lock portion is a cam follower.

5. The tape cassette according to claim 2, wherein left and ride side portions of the inside surface of the back wall of the cassette shell are inclined to serve as cams for guiding the back portion of each lock portion.

6. The tape cassette according to claim 5, wherein the back portion of each lock portion is a cam follower.

* * * * *

UNITED STATES PATENT AND TRADEMARK OFFICE
CERTIFICATE OF CORRECTION

PATENT NO. : 7,199,976 B2
APPLICATION NO. : 11/061638
DATED : April 3, 2007
INVENTOR(S) : Hiroshi Fujii et al.

It is certified that error appears in the above-identified patent and that said Letters Patent is hereby corrected as shown below:

<u>Column 22, Line 23:</u>
"ride" should read -- right --.

<u>Column 12, Line 30:</u>
"ride" should read -- right --.

Signed and Sealed this

Seventh Day of August, 2007

JON W. DUDAS
*Director of the United States Patent and Trademark Office*